United States Patent
Baj et al.

(10) Patent No.: US 12,166,670 B2
(45) Date of Patent: *Dec. 10, 2024

(54) SESSION MONITORING USING METRICS OF SESSION ESTABLISHMENT

(71) Applicant: Juniper Networks, Inc., Sunnyvale, CA (US)

(72) Inventors: Michael Baj, Bedford, MA (US); Patrick J. MeLampy, Dunstable, MA (US); Ryan Koss, Merrimack, NH (US); Kaushik Adesh Agrawal, Chelmsford, MA (US); Abilash Menon, Boxborough, MA (US); Michael John Adams, Roslindale, MA (US); Sarah V. Jaffer, Billerica, MA (US)

(73) Assignee: JUNIPER NETWORKS, INC., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/191,809

(22) Filed: Mar. 28, 2023

(65) Prior Publication Data
US 2023/0370365 A1   Nov. 16, 2023

Related U.S. Application Data

(63) Continuation of application No. 17/239,277, filed on Apr. 23, 2021, now Pat. No. 11,658,902.
(Continued)

(51) Int. Cl.
*H04L 45/302* (2022.01)
*H04L 9/40* (2022.01)
(Continued)

(52) U.S. Cl.
CPC .......... *H04L 45/302* (2013.01); *H04L 45/123* (2013.01); *H04L 45/24* (2013.01);
(Continued)

(58) Field of Classification Search
CPC ..... H04L 45/123; H04L 45/24; H04L 45/302; H04L 45/38; H04L 45/566; H04L 63/166
See application file for complete search history.

(56) References Cited

U.S. PATENT DOCUMENTS

| | | | |
|---|---|---|---|
| 6,260,072 B1 | 7/2001 | Rodriguez-Moral |
| 6,310,883 B1 | 10/2001 | Mann et al. |

(Continued)

FOREIGN PATENT DOCUMENTS

| | | | |
|---|---|---|---|
| CN | 101107817 A | 1/2008 |
| CN | 101461198 A | 6/2009 |

(Continued)

OTHER PUBLICATIONS

Response to Communication Pursuant to Rules 161(1) and 162 EPC dated Nov. 30, 2022, from counterpart European Application No. 21725641.1, filed May 23, 2023, 18 pp.

(Continued)

*Primary Examiner* — Jeong S Park
(74) *Attorney, Agent, or Firm* — Shumaker & Sieffert, P.A.

(57) ABSTRACT

A first router generates session establishment metrics for use in network path selection. For example, a plurality of routers connect a client device to a network service instance hosted by a server. A first router is connected to the network service instance via first and second paths. The first router receives session performance requirements for a session between the client device and the network service instance. The first router forwards, along the first path, network traffic for the session by modifying a first packet of the session to include a session identifier for the session. The first router determines that session establishment metrics for the session do not satisfy the session performance requirements. In response, the first router forwards, along the second path, the (Continued)

network traffic for the session by modifying a second packet of the session to include the session identifier for the session.

18 Claims, 5 Drawing Sheets

Related U.S. Application Data

(60) Provisional application No. 63/014,477, filed on Apr. 23, 2020.

(51) Int. Cl.
*H04L 45/00* (2022.01)
*H04L 45/12* (2022.01)
*H04L 45/24* (2022.01)

(52) U.S. Cl.
CPC ............ *H04L 45/38* (2013.01); *H04L 45/566* (2013.01); *H04L 63/166* (2013.01)

(56) References Cited

U.S. PATENT DOCUMENTS

| | | |
|---|---|---|
| 6,515,963 B1 | 2/2003 | Bechtolsheim et al. |
| 6,563,824 B1 | 5/2003 | Bhatia et al. |
| 6,584,071 B1 | 6/2003 | Kodialam et al. |
| 6,721,334 B1 | 4/2004 | Ketcham |
| 6,738,387 B1 | 5/2004 | Lin et al. |
| 6,778,531 B1 | 8/2004 | Kodialam et al. |
| 6,798,743 B1 | 9/2004 | Ma et al. |
| 7,020,087 B2 | 3/2006 | Steinberg et al. |
| 7,020,143 B2 | 3/2006 | Zdan |
| 7,035,214 B1 | 4/2006 | Seddigh et al. |
| 7,068,600 B2 | 6/2006 | Cain |
| 7,106,739 B2 | 9/2006 | Beier |
| 7,120,118 B2 | 10/2006 | Rajagopal et al. |
| 7,154,902 B1 | 12/2006 | Sikdar |
| 7,218,632 B1 | 5/2007 | Bechtolsheim et al. |
| 7,315,541 B1 | 1/2008 | Housel et al. |
| 7,373,660 B1 | 5/2008 | Guichard et al. |
| 7,466,703 B1 | 12/2008 | Arunachalam et al. |
| 7,522,603 B2 | 4/2009 | Vasseur |
| 7,536,720 B2 | 5/2009 | Burdett et al. |
| 7,634,805 B2 | 12/2009 | Aroya |
| 7,668,164 B2 | 2/2010 | Jonsson |
| 7,706,411 B2 | 4/2010 | Wakumoto et al. |
| 7,730,301 B2 | 6/2010 | Correll et al. |
| 7,773,611 B2 | 8/2010 | Booth, III et al. |
| 7,818,450 B2 | 10/2010 | Chen et al. |
| 7,872,973 B2 | 1/2011 | Sterne et al. |
| 8,068,417 B1 | 11/2011 | Roberts |
| 8,094,560 B2 | 1/2012 | Bagepalli et al. |
| 8,139,479 B1 | 3/2012 | Raszuk |
| 8,159,989 B2 | 4/2012 | Inouchi et al. |
| 8,259,736 B2 | 9/2012 | Jain |
| RE44,119 E | 4/2013 | Wang et al. |
| 8,437,248 B2 | 5/2013 | Li et al. |
| 8,527,641 B2 | 9/2013 | Degaonkar et al. |
| 8,570,893 B2 | 10/2013 | Guo et al. |
| 8,584,199 B1 | 11/2013 | Chen et al. |
| 8,619,775 B2 | 12/2013 | Amir et al. |
| 8,634,428 B2 | 1/2014 | Le Pennec et al. |
| 8,660,126 B2 | 2/2014 | Crambert et al. |
| 8,804,489 B2 | 8/2014 | Lu et al. |
| 8,942,085 B1 | 1/2015 | Pani et al. |
| 8,989,020 B2 | 3/2015 | So |
| 9,059,920 B2 | 6/2015 | Ravindran et al. |
| 9,160,652 B2 | 10/2015 | Taillon et al. |
| 9,185,186 B2 | 11/2015 | Hong et al. |
| 9,240,953 B2 | 1/2016 | Carlstrom |
| 9,276,864 B1 | 3/2016 | Vincent |
| 9,614,756 B2 | 4/2017 | Joshi |
| 9,634,936 B2 | 4/2017 | Bansal et al. |
| 9,699,069 B1 | 7/2017 | Kielhofner et al. |
| 9,729,439 B2 | 8/2017 | MeLampy et al. |
| 9,729,682 B2 | 8/2017 | Kumar et al. |
| 9,762,485 B2 | 9/2017 | Kaplan et al. |
| 9,871,748 B2 | 1/2018 | Gosselin et al. |
| 9,985,883 B2 | 5/2018 | MeLampy et al. |
| 10,091,108 B2 | 10/2018 | Lin et al. |
| 10,200,264 B2 | 2/2019 | Menon et al. |
| 10,244,003 B2 | 3/2019 | Gunnalan et al. |
| 10,277,506 B2 | 4/2019 | Timmons et al. |
| 10,362,121 B1 | 7/2019 | Crausaz |
| 10,432,522 B2 | 10/2019 | Kaplan et al. |
| 10,637,764 B2 | 4/2020 | Verma et al. |
| 10,841,205 B2 | 11/2020 | Kucera |
| 10,965,577 B2 | 3/2021 | Mirsky et al. |
| 10,999,182 B2 | 5/2021 | Kaplan et al. |
| 11,165,863 B1 | 11/2021 | Timmons et al. |
| 11,658,902 B2 * | 5/2023 | Baj ....................... H04L 45/123 709/238 |
| 2001/0030649 A1 | 10/2001 | Mamiya et al. |
| 2002/0021689 A1 | 2/2002 | Robbins et al. |
| 2002/0044553 A1 | 4/2002 | Chakravorty |
| 2002/0075883 A1 | 6/2002 | Dell et al. |
| 2002/0114332 A1 | 8/2002 | Apostolopoulos et al. |
| 2002/0176363 A1 | 11/2002 | Durinovic-Johri et al. |
| 2003/0141093 A1 | 7/2003 | Tirosh et al. |
| 2003/0162499 A1 | 8/2003 | Jonsson |
| 2003/0198189 A1 | 10/2003 | Roberts et al. |
| 2003/0214938 A1 | 11/2003 | Jindal et al. |
| 2004/0088542 A1 | 5/2004 | Daude et al. |
| 2004/0264481 A1 | 12/2004 | Darling et al. |
| 2005/0013300 A1 | 1/2005 | Akahane et al. |
| 2005/0036616 A1 | 2/2005 | Huang et al. |
| 2005/0054346 A1 | 3/2005 | Windham et al. |
| 2005/0063307 A1 | 3/2005 | Samuels et al. |
| 2005/0157742 A1 * | 7/2005 | Chen .................. H04L 12/1886 370/432 |
| 2005/0182932 A1 | 8/2005 | Wheeler |
| 2005/0238022 A1 | 10/2005 | Panigrahy |
| 2005/0249206 A1 | 11/2005 | Wybenga et al. |
| 2006/0039279 A1 | 2/2006 | Sturrock et al. |
| 2006/0176894 A1 | 8/2006 | Oh et al. |
| 2006/0187942 A1 | 8/2006 | Mizutani et al. |
| 2006/0268932 A1 | 11/2006 | Singh et al. |
| 2006/0285489 A1 | 12/2006 | Francisco et al. |
| 2007/0171825 A1 | 7/2007 | Roberts et al. |
| 2007/0171826 A1 | 7/2007 | Roberts et al. |
| 2008/0214175 A1 | 9/2008 | Papadoglou et al. |
| 2008/0222289 A1 | 9/2008 | Conway et al. |
| 2008/0222294 A1 * | 9/2008 | Liang .................. H04W 36/249 709/227 |
| 2008/0259938 A1 | 10/2008 | Keene et al. |
| 2009/0007021 A1 | 1/2009 | Hayton |
| 2009/0046587 A1 | 2/2009 | Kothari et al. |
| 2009/0059958 A1 | 3/2009 | Nakata |
| 2009/0086651 A1 | 4/2009 | Luft et al. |
| 2009/0097406 A1 | 4/2009 | Nilakantan et al. |
| 2010/0054257 A1 * | 3/2010 | Dolganow ............... H04L 65/80 370/395.21 |
| 2010/0125898 A1 | 5/2010 | Dubuc et al. |
| 2010/0191968 A1 | 7/2010 | Patil et al. |
| 2010/0248727 A1 | 9/2010 | Karaoguz et al. |
| 2011/0113142 A1 | 5/2011 | Rangegowda et al. |
| 2011/0173324 A1 | 7/2011 | Wang et al. |
| 2012/0106428 A1 | 5/2012 | Schlicht et al. |
| 2012/0144061 A1 | 6/2012 | Song |
| 2012/0182862 A1 * | 7/2012 | Cirkovic .................. H04L 45/50 370/220 |
| 2012/0236860 A1 | 9/2012 | Kompella et al. |
| 2012/0250516 A1 * | 10/2012 | Aggarwal ............... H04L 45/22 370/252 |
| 2013/0227166 A1 | 8/2013 | Ravindran et al. |
| 2013/0238813 A1 | 9/2013 | Tanimoto |
| 2013/0250769 A1 | 9/2013 | Karaoguz et al. |
| 2013/0286846 A1 | 10/2013 | Atlas et al. |
| 2013/0297824 A1 | 11/2013 | Lan et al. |
| 2014/0040488 A1 | 2/2014 | Small et al. |
| 2014/0146916 A1 | 5/2014 | Shattil |
| 2014/0177460 A1 | 6/2014 | Keskkula et al. |
| 2014/0269422 A1 | 9/2014 | Filsfils et al. |

(56) References Cited

U.S. PATENT DOCUMENTS

| | | | |
|---|---|---|---|
| 2015/0092551 | A1 | 4/2015 | Moisand et al. |
| 2015/0113164 | A1 | 4/2015 | Butler et al. |
| 2015/0146525 | A1 | 5/2015 | Shibata et al. |
| 2015/0188814 | A1 | 7/2015 | Jain et al. |
| 2015/0229618 | A1 | 8/2015 | Wan et al. |
| 2015/0381324 | A1 | 12/2015 | Mirsky et al. |
| 2016/0036692 | A1 | 2/2016 | Leeb et al. |
| 2016/0094444 | A1 | 3/2016 | Melampy et al. |
| 2016/0164780 | A1 | 6/2016 | Timmons et al. |
| 2016/0255542 | A1 | 9/2016 | Hughes et al. |
| 2016/0294681 | A1 | 10/2016 | Khakpour et al. |
| 2016/0294715 | A1* | 10/2016 | Raindel ............... H04L 47/34 |
| 2016/0294734 | A1* | 10/2016 | Jang ................. H04L 45/22 |
| 2016/0330106 | A1* | 11/2016 | Menezes ............. H04L 45/38 |
| 2016/0373344 | A1 | 12/2016 | Wohlert |
| 2016/0373348 | A1 | 12/2016 | Renzullo et al. |
| 2017/0019817 | A1 | 1/2017 | Senarath et al. |
| 2017/0063681 | A1 | 3/2017 | Kaplan et al. |
| 2017/0180486 | A1* | 6/2017 | Mehta ............... H04L 43/0852 |
| 2017/0310581 | A1 | 10/2017 | Endo et al. |
| 2017/0346730 | A1 | 11/2017 | Menon et al. |
| 2017/0346787 | A1 | 11/2017 | Menon et al. |
| 2018/0026885 | A1 | 1/2018 | Jeuk et al. |
| 2018/0063608 | A1 | 3/2018 | Prakash et al. |
| 2018/0097720 | A1 | 4/2018 | Jaffer et al. |
| 2018/0213460 | A1 | 7/2018 | Adella et al. |
| 2018/0219980 | A1 | 8/2018 | McCulley et al. |
| 2018/0227216 | A1 | 8/2018 | Hughes |
| 2018/0302457 | A1 | 10/2018 | Hassan et al. |
| 2019/0021065 | A1 | 1/2019 | Zahemszky et al. |
| 2019/0036814 | A1 | 1/2019 | Aranha et al. |
| 2019/0253341 | A1 | 8/2019 | Timmons et al. |
| 2019/0334876 | A1* | 10/2019 | Adams ............. H04L 63/0428 |
| 2020/0196214 | A1 | 6/2020 | Martinez-Heath et al. |
| 2020/0366589 | A1 | 11/2020 | Kaplan et al. |
| 2020/0366590 | A1 | 11/2020 | Kaplan et al. |
| 2020/0366598 | A1 | 11/2020 | Kaplan et al. |
| 2020/0366599 | A1 | 11/2020 | Kaplan et al. |
| 2020/0403890 | A1 | 12/2020 | McCulley et al. |
| 2021/0076292 | A1 | 3/2021 | Pignataro et al. |
| 2021/0144050 | A1 | 5/2021 | Fagan |
| 2021/0250273 | A1 | 8/2021 | Kaplan et al. |
| 2021/0336875 | A1 | 10/2021 | Baj et al. |
| 2022/0141126 | A1 | 5/2022 | Timmons et al. |

FOREIGN PATENT DOCUMENTS

| | | |
|---|---|---|
| CN | 101552703 A | 10/2009 |
| CN | 101606341 A | 12/2009 |
| CN | 101646220 A | 2/2010 |
| CN | 101068242 B | 4/2010 |
| CN | 102158371 A | 8/2011 |
| CN | 101640629 B | 8/2012 |
| CN | 102739507 A | 10/2012 |
| CN | 101207604 B | 3/2013 |
| CN | 102769679 B | 6/2015 |
| CN | 103179192 B | 11/2015 |
| CN | 105245469 A | 1/2016 |
| CN | 105306333 A | 2/2016 |
| CN | 103188260 B | 3/2017 |
| CN | 106559324 A | 4/2017 |
| CN | 106716976 A | 5/2017 |
| CN | 107995045 A | 5/2018 |
| CN | 108604999 A | 9/2018 |
| CN | 109076017 A | 12/2018 |
| CN | 109936516 A | 6/2019 |
| EP | 1313267 B1 | 12/2006 |
| KR | 10-2011-0062994 A | 6/2011 |
| KR | 20160041631 A | 4/2016 |
| WO | 03/058868 A2 | 7/2003 |
| WO | 2007/084707 A2 | 7/2007 |
| WO | 2007/084755 A2 | 7/2007 |
| WO | 2008/043230 A1 | 4/2008 |
| WO | 2015/131537 A1 | 9/2015 |
| WO | 2016/007052 A1 | 1/2016 |

OTHER PUBLICATIONS

"Transmission Control Protocol," DARPA Internet Program Protocol Specification, Information Sciences Institute, RFC 793, Sep. 1981, 91 pp.

Berners-Lee et al.—Uniform Resource Identifier (URI): Generic Syntax, Network Working Group, Request for Comments 3986, The Internet Society, 61 pages, Jan. 2005.

Bjorklund-Yang—A Data Modeling Language for the Network Configuration Protocol (NETCONF), Internet Engineering Task Force (IETF), Request for Comments 6020, ISSN: 2070-1721, 173 pages, Oct. 2010.

CAIDA—Observing routing asymmetry in Internet traffic, (www.caida.org/research/traffic-analysis/asymmetry/1), 7 pages, dated Jul. 17, 2013.

Cao et al., "Semantic Overlay Based Services Routing Between MPLS Domains", Jan. 1, 2005, Distributed Computing—IWDC 2005 Lecture Notes in Computer Science; LNCS. Springer, Berlin, DE, pp. 416-427, XP019026591, ISBN: 978-3-540-30959-8.

Chiosi et al.—Network Functions Virtualisation—Introductory White Paper, Issue 1, at the "SDN and OpenFlow World Congress", Darmstadt-Germany, 16 pages, dated Oct. 22, 2012.

Cisco Systems—Parallel Express Forwarding on the Cisco 10000 Series, (White Paper) Cisco Systems, printed Jun. 17, 2015, 4 pages.

Data Plane Development Kit—Programmer's Guide, Release 16.04.0, 216 pages, Apr. 12, 2016.

Davis—Layer 3 Switches Explained, Happy Router, 6 pages, dated Aug. 30, 2007.

Dierks et al., "The Transport Layer Security (TLS) Protocol Version 1.2," Network Working Group, RFC 5246, Aug. 2008, 105 pp.

Filsfils et al.—Segment Routing Architecture, Network Working Group, Draft, 28 pages, Oct. 21, 2013.

Hansson et al.—A Unified Approach to Constrained Mapping and Routing on Network-on-Chip Architectures, CODES+ISSS '05 Proceedings of the 3rd IEEE/ACM/IFIP International Conference on Hardware/Software Co-design and System Synthesis, 6 pages, Sep. 19-21, 2005.

Herbert—xps: Transmit Packet Steering, Eklektix, Inc., 11 pages, Oct. 26, 2010.

IANA—Transmission Control Protocol (TCP) Parameters, (www.iana.org/assignments/tcp-parameters/tcparameters.xhtm), 5 pages, dated Sep. 22, 2014.

International Preliminary Report on Patentability from International Application No. PCT/US2021/028945 dated Nov. 3, 2022, 8 pp.

International Search Report and Written Opinion of International Application No. PCT/US2021/028945, mailed Aug. 9, 2021, 11 pp.

Iyer—Load Balancing and Parallelism for the Internet, A Dissertation submitted to the Dept. of Computer Science and the Committee on Graduate Studies of Stanford University in Partial Fulfillment of the Requirements for the Degree of Doctor of Philosophy, retrieved on the internet at http://yuba.stanford.edu/~sundaes/Dissertation/sundar_thesis.pdf, 436 pages, Jul. 2008.

Katz et al.—Bidirectional Forwarding Detection (BFD), Internet Engineering Task Force (IETF), Request for Comments 5880, ISSN: 2070-1721, Juniper Networks, 49 pages, Jun. 2010.

Klement—1.2 Overview of a TCP communications session, RPG IV Socket Tutorial (http://www.scottklement.com/rpg/socketut/overview), 2 pages, Oct. 7, 2014.

Microsoft—Introduction to Receive Side Scaling, Developer Resources, https://msdn.microsoft.com/enus/library/windows/hardware/ff556942(v=vs.85).aspx, 3 pages, Apr. 2014.

Microsoft—Non-RSS Receive Processing, Developer Resources, https://msdn.microsoft.com/enus/library/windows/hardware/ff568798(v=vs.85).aspx, 2 pages, Jan. 2015.

Microsoft—RSS with a Single Hardware Receive Queue, Developer Resources, https://msdn.microsoft.com/enus/library/windows/hardware/ff570727(v=vs.85).aspx, 2 pages, Jan. 2015.

Microsoft—RSS with Hardware Queuing, Developer Resources, https://msdn.microsoft.com/enus/library/windows/hardware/ff570728(v=vs.85).aspx, 2 pages, Jan. 2015.

(56) References Cited

OTHER PUBLICATIONS

PC Magazine Encyclopedia—Definition of TCPIIP abc's, PC Magazine Encyclopedia (www.pcmag.com/encyclopedia/term/52615), 5 pages, 2005.
Postel, "User Datagram Protocol," RFC 768, Aug. 28, 1980, 3 pp.
Postel, "Internet Control Message Protocol—DARPA Internet Program Protocol Specification," RFC 792, Information Sciences Institute, Network Working Group, Sep. 1981, 21 pp.
Previdi, et al.—1Pv6 Segment Routing Header (SRH), Network working Group, Draft, 24 pages, Jul. 3, 2014.
Prosecution History from U.S. Appl. No. 17/239,277, dated May 18, 2022 through Jan. 13, 2023, 80 pp.
Rescorla, "The Transport Layer Security (TLS) Protocol Version 1.3," Internet Engineering Task Force (IETF), RFC 8446, Aug. 2018, pp.
Roberts—The Next Generation of IP—Flow Routing, SSGRR 2003S International Conference, L'Aquila Italy, 11 pages, Jul. 29, 2003.
Rouse—What is routing table?, Posted by Margaret Rouse (http://searchnetworking.techtarget.com/definition/routingtable), 5 pages, Apr. 2007.
Shang et al.—Making Better Use of All Those TCP ACK Packets, Computer Science Department, Worcester Polytechnic Institute, 10 pages, 2005. Applicant points out in accordance with MPEP 609.04(a) that the 2005 year of publication is sufficiently earlier than the effective U.S. filing date of the present application, and any foreign priority date that the particular month of publication is not in issue.
Shaw—Multi-queue network interfaces with SMP on Linux, Greenhost, https://greenhost.net/2013/04/10/multi-queuenetwork-interfaces-with-smp-on-linux/, 5 pages, Apr. 10, 2013.
Sollins et al.—Functional Requirements for Uniform Resource Names, Network Working Group, Request for Comments 1737, 7 pages, Dec. 1994.
Srinivasan et al.—A Technique for Low Energy Mapping and Routing inNetwork-on-Chip Architectures, ISLPED '05 Proceedings of the 2005 International Symposium on Low Power Electronics and Design, 6 pages, Aug. 8-10, 2005.
Varela et al., "Providing service differentiation in pure IP-based networks", Computer Communications, Elsevier Science Publishers BV, Amsterdam, NL, vol. 35. No. 1, Jul. 27, 2011, pp. 33-46, XP028109324. ISSN: 0140-3664. DOI: 10.1016/J.COMCOM.2011.07.006.
Wikipedia—Active queue management, https://en.wikipedia.org/wiki/Active_queue management, 2 pages, Apr. 22, 2015.
Wikipedia—Equal-cost multi-path routing, 1 page, dated Sep. 12, 2013.
Wikipedia—LAN switching, 5 pages, dated Jun. 12, 2013.
Wikipedia—Management information base, 6 pages, dated Jul. 15, 2013.
Wikipedia—Network address translation, 11 pages, dated Sep. 24, 2013.
Wikipedia—Network interface controller, https://en.wikipedia.org/wiki/Network interface_controller,5 pages, May 19, 2015.
Wikipedia—Network socket, 4 pages, dated Sep. 19, 2013.
Wikipedia—Open vSwitch, 2 pages, dated Nov. 24, 2013.
Wikipedia—Reverse path forwarding, 3 pages, dated Jul. 31, 2013.
Wikipedia—Router (computing), 8 pages, dated Sep. 23, 2013.
Wikipedia—Software-defined networking, 6 pages, dated Sep. 16, 2013.
Wikipedia—Transmission Control Protocol, 18 pages, dated Sep. 16, 2013.
First Office Action and Search Report, and translation thereof, from counterpart Chinese Application No. 202180030446.7 dated Aug. 14, 2023, 10 pp.
Hu et al., "Routing Protocol with QoS Support of an Ad Hoc Network", Ad Hoc QoS, EJL Science Chengdu Co., Ltd, Chengdu Sichuan China 610041, Aug. 2009, Translation Provided for Abstract Only, pp. 46-51.
Orzen et al., "Network Events in the Dynamic Selection of Real-Time Session Fault Tolerant Routes", INES 2017. 21st International Conference on Intelligent Engineering Systems in Larnaca Cyprus, IEEE, Oct. 20-23, 2017, 4 pp.
Notice of Intent to Grant from counterpart Chinese Application No. 202180030446.7 dated Apr. 19, 2024, 5 pp.

\* cited by examiner

SESSION MONITORING USING METRICS OF SESSION ESTABLISHMENT

This application is a continuation of U.S. patent application Ser. No. 17/239,277, filed Apr. 23, 2021, which claims the benefit of U.S. Provisional Application No. 63/014,477, filed on Apr. 23, 2020, the entire content of which is incorporated herein by reference.

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and designated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow. To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

In general, the disclosure describes techniques for monitoring a session using metrics of session establishment for the session. A client device may establish a session to access a network service instantiated by a network service instance (also referred to herein as a "service instance"). After the session is established, traffic is forwarded along a forward path and a reverse path between the client device and the service instance. In some examples, a session may fail to be established, an existing session may longer be established, or the session may underperform according to session performance requirements (e.g., requirements defined by a Software License Agreement (SLA)). This may occur even when no operation problem exists, e.g., with the path or router interfaces on an intermediary network between the client device and the network service instance. For example, a client device may attempt to establish a first communication session (e.g., TLS session) with a first network service instance. The first network service instance may successfully complete the key exchange phase and the server parameters phase of the TLS handshake, but fail to complete the authentication phase of the TLS handshake. Thus, the first TLS session between the client device and the first network service instance fails to establish, even though no problem exists at the link, network, or transport levels (e.g., OSI reference model Layers 2, 3, or 4) between the client device and the first network service instance. Typically, a router may be unable to detect problems at the session level (e.g., OSI reference model Layer 5), and therefore may be unable to reroute network traffic at the session level where the paths and interfaces to service instance 104 is properly operating. Furthermore, rerouting traffic at Layers 2, 3, or 4, may disrupt other sessions that share an interface of the router or similar path as the problematic session but remain operable.

In accordance with the techniques of the disclosure, a router generates one or more metrics of session establishment for a session. For example, a router as described herein may obtain metrics of session establishment (also referred to herein as "session establishment metrics") and use such metrics to determine that whether a session has been established (or fails to be established) between a client device and a network service instance and/or whether the established session does not meet session performance requirements (also referred to herein as "session requirements"). The router may use the session metrics and session performance requirements to determine whether to switch the network traffic for the session between the client device and the network service instance from a first path to a second path so as to ensure compliance with the session performance requirements without disrupting other, operable sessions that traverse the first path.

For example, an intermediate network comprises a plurality of routers and is positioned between a client device and a network service instance hosted by a server. A first router within the intermediate network is connected to the network service instance via a first path and a second path that is different than the first path. For example, the first path and the second path may each include at least one router that is different or at least one interface of the same router that is different, etc. The first router forwards, along the first path, network traffic for a session between the client device and the network service instance.

In some examples, the first router is configured to perform session-based routing for the session between the client device and the network service instance. For example, the first router modifies a first packet of at least one of a forward packet flow and a reverse packet flow of the session to include a header comprising a source address of the first router and a destination address of a second router along the first path and a portion of metadata specifying a session identifier for the session.

The first router obtains one or more metrics of session establishment of the session between the client device and the network service instance. The metrics of session establishment may describe data related to the successful or unsuccessful establishment of one or more sessions. For example, the session establishment metrics may include, e.g., a time elapsed to establish the session, a number of sessions that successfully establish, a number of sessions that fail to establish due to timeout, a number of sessions that fail to establish due to an unreachable destination, a number of sessions that close prior to session establishment, etc. The first router may derive the metrics of session establishment by monitoring the state of the first session prior to, during, or after establishment.

The first router receives one or more session performance requirements for the session between the client device and the network service instance, which may include SLA requirements for the session. The first router compares the metrics to the session performance requirements. In response to determining that the one or more metrics of session establishment of the session do not satisfy the one or more session performance requirements for the session, the first router forwards, along the second path, the network traffic for the session between the client device and the network service instance. In some examples, the first router modifies a second packet of at least one of the forward packet flow and the reverse packet flow of the session to include a header comprising a source address of the first router and a destination address of a third router along the second path and the portion of metadata specifying the session identifier for the session.

In some examples, the first router removes the first path from inclusion in a session load balancer that load balances customer traffic associated with the network service along different paths. Additionally, a router as described herein may use such metrics to select one or more sessions, detect blackholing of traffic, determine that a session does not satisfy SLA requirements, or to load balance customer traffic associated with a network service across different paths.

The techniques of the disclosure may provide specific improvements to the computer-related field of computer networking and path selection that have practical applications. For example, the techniques of the disclosure may enable a router to monitor a state of a session to determine whether the session has established, and generate metrics related to whether the session has established. A router as described herein may use such metrics to perform path selection and routing at the session level (e.g., OSI reference model Layer 5), as opposed to other routers which may be only able to perform path selection and routing at the link, network, or transport levels (e.g., OSI reference model Layers 2, 3, or 4). Accordingly, such a router may provide more efficient and granular routing of customer traffic within the network.

Additionally, a router as described herein may use metrics of session establishment to determine whether a session satisfies SLA requirements, and in response, select a different path or interface for transporting network traffic associated with the session, so as to ensure compliance with the SLA. Such a router as described herein may therefore detect networking problems at the session level, (e.g., OSI reference model Layer 5), even where no problem exists with an interface or path at the link, network, or transport levels (e.g., OSI reference model Layers 2, 3, or 4), and perform actions to ensure compliance with session-level SLA requirements.

Additionally, the techniques of the disclosure may enable a router as described herein to switch from using a first interface or path to forward network traffic associated with an underperforming session to using a second interface or path to forward the network traffic associated with underperforming session, without tearing down the first path or deactivating the first interface. Therefore, the techniques of the disclosure may enable the router to reroute traffic for an underperforming session without adversely affecting other sessions that perform according to SLA requirements but, e.g., share a path with the underperforming session, or use the same interface as the underperforming session. Thus, a router as described herein may provide more granular and efficient routing of customer traffic over other routers that may be required to tear down a path or deactivate an interface associated with an underperforming session.

In one example, this disclosure describes a method comprising: receiving, by a first router of a plurality of routers of a network connecting a client device to a network service instance hosted by a server, one or more session performance requirements for a session between the client device and the network service instance, the session comprising a forward packet flow and a reverse packet flow, wherein the first router is connected to the network service instance via a first path on the network and a second path on the network, the second path being different from the first path; forwarding, by the first router and along the first path, network traffic for the session between the client device and the network service instance, the forwarding including modifying a first packet of at least one of the forward packet flow and the reverse packet flow of the session to include: a header comprising a source address of the first router and a destination address of a second router of the plurality of routers along the first path; and a portion of metadata specifying a session identifier for the session; obtaining, by the first router, one or more metrics of session establishment of the session; determining, by the first router, that the one or more metrics of session establishment of the session do not satisfy the one or more session performance requirements for the session; and in response to determining that the one or more metrics of session establishment of the session do not satisfy the one or more session performance requirements for the session, forwarding, by the first router and along the second path, the network traffic for the session between the client device and the network service instance, the forwarding including modifying a second packet of at least one of the forward packet flow and the reverse packet flow of the session to include: a header comprising a source address of the first router and a destination address of a third router of the plurality of routers along the second path; and the portion of metadata specifying the session identifier for the session.

In another example, this disclosure describes a first router of a plurality of routers of a network, the first router comprising: processing circuitry; and a memory operably coupled to the processing circuitry and comprising instructions configured to cause the processing circuitry to: receive one or more session performance requirements for a session between a client device and a network service instance hosted by a server, the session comprising a forward packet flow and a reverse packet flow, wherein the first router is connected to the network service instance via a first path on the network and a second path on the network, the second path being different from the first path, and wherein the network connects the client device to the network service instance; forward, along the first path, network traffic for the session between the client device and the network service instance, the forwarding including modifying a first packet of at least one of the forward packet flow and the reverse packet flow of the session to include: a header comprising a source address of the first router and a destination address of a second router of the plurality of routers along the first path; and a portion of metadata specifying a session identifier for the session; obtaining, by the first router, one or more metrics of session establishment of the session; determine that the one or more metrics of session establishment of the session do not satisfy the one or more session performance requirements for the session; and in response to determining that the one or more metrics of session establishment of the session do not satisfy the one or more session performance requirements for the session, forward, along the second path, the network traffic for the session between the client device and the network service instance, the forwarding including modifying a second packet of at least one of the forward packet flow and the reverse packet flow of the session to include: a header comprising a source address of the first router and a destination address of a third router of the plurality of routers along the second path; and the portion of metadata specifying the session identifier for the session.

In another example, this disclosure describes a non-transitory, computer-readable medium comprising instructions that, when executed, are configured to cause processing circuitry of a first router of a plurality of routers of a network to: receive one or more session performance requirements for a session between a client device and a network service instance hosted by a server, the session comprising a forward packet flow and a reverse packet flow, wherein the first router is connected to the network service instance via a first path on the network and a second path on the network, the second path being different from the first path, and wherein the network connects the client device to the network service instance; forward, along the first path, network traffic for the session between the client device and the network service instance, the forwarding including modifying a first packet of at least one of the forward packet flow and the reverse packet flow of the session to include: a header comprising a source address of the first router and a destination address of a second router of the plurality of routers along the first path; and a portion of metadata specifying a session identifier for the session; obtaining, by the first router, one or more metrics of session establishment of the session; determine that the one or more metrics of session establishment of the session do not satisfy the one or more session performance requirements for the session; and in response to determining that the one or more metrics of session establishment of the session do not satisfy the one or more session performance requirements for the session, forward, along the second path, the network traffic for the session between the client device and the network service instance, the forwarding including modifying a second packet of at least one of the forward packet flow and the reverse packet flow of the session to include: a header comprising a source address of the first router and a destination address of a third router of the plurality of routers along the second path; and the portion of metadata specifying the session identifier for the session.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
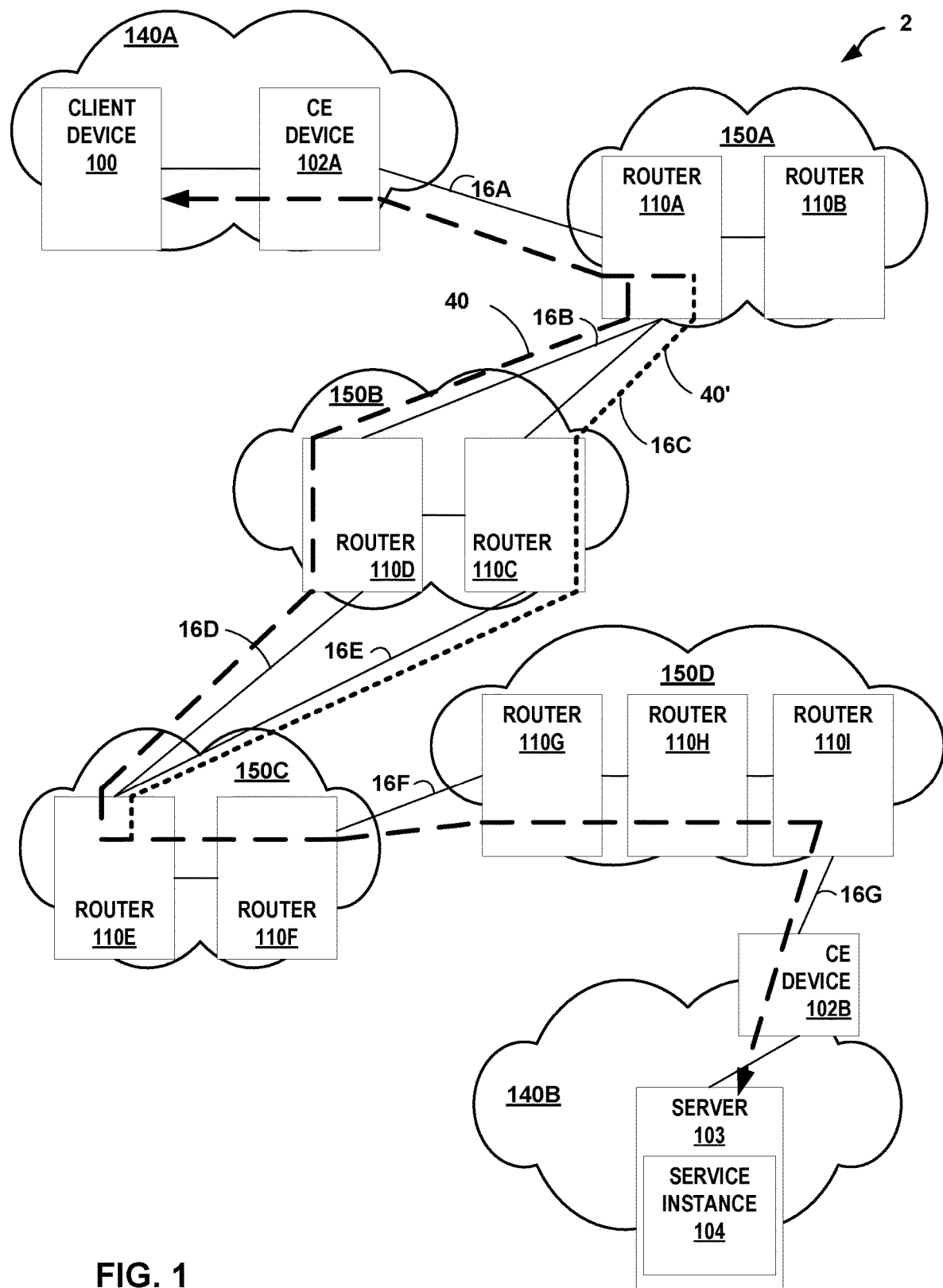
FIG. 1 is a block diagram illustrating an example computer network system in accordance with the techniques of the disclosure.

FIG. 1 is a block diagram illustrating example computer network system 2 in accordance with the techniques of the disclosure. In the example of FIG. 1, computer network system 2 includes service provider networks 150A-150D (collectively, "service provider networks 150") configured to provide Wide Area Network WAN) connectivity to disparate customer networks 140A-140B ("customer networks 140"). Routers 110A-110I (collectively, "routers 110") of service provider networks 150 provide client device 100 and server 103 associated with customer networks 140 with access to service provider networks 150 via customer edge devices 102A-102B (collectively, "CE devices 102"). In some examples, customer network 140A is an enterprise network. In some examples, customer network 140B is a cloud service provider (CSP) network that provides a network service to client device 100 in the form of service instance 104 hosted by server 103. Customer network 140A is depicted as having a single client device 100 for ease of illustration. Typically, customer network 140A includes many client devices 100, each of which may access CSP network 140B to access one or more network services. Communication links 16A-16G (collectively, links "16") may be Ethernet, ATM or any other suitable network connections.

CE devices 102 and routers 110 are illustrated as routers in the example of FIG. 1. However, techniques of the disclosure may be implemented using any router, such as switches, routers, gateways, or other suitable routers that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1. The configuration of computer network system 2 illustrated in FIG. 1 is merely an example. For example, computer network system 2 may include any number of customer networks 140. Nonetheless, for ease of description, only customer networks 140A-140B are illustrated in FIG. 1.

Service provider networks 150 represent one or more publicly accessible computer networks that are owned and operated by one or more service providers. Although computer network system 2 is illustrated in the example of FIG. 1 as including multiple interconnected service provider networks 150, in other examples computer network system 2 may alternatively include a single service provider network that provides connectivity between customer networks 140. A service provider is usually a large telecommunications entity or corporation. Each of service provider networks 150 is usually a large Layer-Three (L3) computer network, where reference to a layer followed by a number refers to a corresponding layer in the Open Systems Interconnection (OSI) model. Each service provider network 150 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100 and destination devices 103, with access to the Internet, and may allow the computing devices within customer networks 140 to communicate with each other.

Although additional routers are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

Session-Based Routing

In some examples, routers 110 may implement a stateful, session-based routing scheme that enables each router 110 to independently perform path selection and traffic engineering. The use of session-based routing may enable routers 110 to eschew the use of a centralized controller, such as a Software-Defined Networking (SDN) controller to perform path selection and traffic engineering. In this way, routers 110 may be more efficient and scalable for large networks where the use of an SDN controller would be infeasible. Furthermore, the use of session-based routing may enable routers 110 to eschew the use of tunnels, thereby saving considerable network resources by obviating the need to perform encapsulation and decapsulation at tunnel endpoints. In some examples, routers 110 implement session-based routing as Secure Vector Routing (SVR), provided by Juniper Networks, Inc.

In the example of FIG. 1, client device 100 of system 2 establishes session 40 with service instance 104. Routers 110 facilitate establishment of session 40 by transporting network traffic between client device 100 and service instance 104. In some examples, client device 100 may be considered a "source" device in that client device 100 originates sessions 40 between client device 100 and service instance 104, e.g., client device 100 is the "source" of the first packet of the forward flow of the session. Session 40 includes a forward packet flow originating from client device 100 and destined for service instance 104 hosted by server 103 and a reverse packet flow originating from service instance 104 and destined for client device 100. A forward flow for session 40 traverses a first path including, e.g., client device 100, CE device 102A, routers 110A, 110D, and 110E-110I, CE device 102B, and server 103. As described in more detail below, after determining session establishment metrics for session 40 fails to satisfy session performance requirements, routers 110 may dynamically select a second path over which to forward network traffic for session 40 (represented in FIG. 1 as session 40'). A forward flow for session 40' traverses the second path, which includes, e.g., client device 100, CE device 102A, routers 110A, 110C, and 110E-110I, CE device 102B, and server 103. As depicted in the example of FIG. 1, at least a portion of the first path and second path are the same (e.g., first and second paths both include routers 110A and 110E-110I). However, the first and second paths diverge in that the first path traverses router 110D, while the second path traverses router 110C.

Client device 100 may establish session 40 according to one or more communication session protocols including TCP, TLS, UDP, or ICMP, etc. For example, to establish session 40 according to TCP such that data may be exchanged according to TCP, client device 100 and service instance 104 perform a three-way handshake. Client device 100 sends a first packet comprising a "SYN" flag to service instance 104. Service instance 104 acknowledges receipt of the first packet by responding to client device 100 with a second packet comprising a "SYN-ACK" flag. Client device 100 acknowledges receipt of the second packet by responding to service instance 104 with a third packet comprising an "ACK" flag. After sending the third packet, session 40 is established according to TCP and client device 100 and service instance 104 may exchange data with one another via session 40. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference.

To establish session 40 according to TLS session, client device 100 and service instance 104 perform a TLS handshake to establish a secure connection is in place before transferring data. The TLS handshake occurs in three phases: a key exchange phase, a server parameters phase, and a authentication phase. In the key exchange phase, client device 100 sends a ClientHello message that includes cipher and key information. Service instance 104 responds with a ServerHello message, which indicates negotiated connection parameters. The combination of the ClientHello and the ServerHello determines the shared keys. During the server parameters phase, service instance 104 sends an EncryptedExtensions message followed by a CertificateRequest message to establish the server parameters. Finally, during the authentication phase, client device 100 and service instance 104 exchange authentication messages. Specifically, service instance 104 sends an optional Certificate message, a CertificateVerify message, and a Finished message. Upon receiving the messages from service instance 104, client device 100 responds with its Authentication messages, e.g., a Certificate message, a CertificateVerify message (if requested), and a Finished message. After client device 100 transmits the Finished message, the handshake is complete, and client device 100 and service instance 104 may exchange data with one another via session 40 according to TLS. Additional example information regarding TLS is described in "The Transport Layer Security (TLS) Protocol Version 1.2," RFC 5246, IETF, August 2008, available at https://tools.ietf.org/html/rfc5246; and "The Transport Layer Security (TLS) Protocol Version 1.3," RFC 8446, IETF, August 2018, available at https://tools.ietf.org/html/rfc8446, the entire contents of each of which are incorporated herein by reference.

UDP is a connectionless protocol in that client device 100 does not verify that the service instance 104 is capable of receiving data prior to transmitting data. To establish session 40 according to UDP, client device 100 transmits a first packet to service instance 104. Session 40 may be considered "established" according to UDP upon receipt by client device 100 of any packet from service instance 104, which implies that service instance 104 successfully received the first packet from client device 100, responded, and client device 100 was able to receive the response from service instance 104. Additional example information regarding UDP is described in "User Datagram Protocol," RFC 768, IETF, Aug. 28, 1980, available at https://tools.ietf.org/html/rfc768, the entire contents of which are incorporated herein by reference.

ICMP is a control protocol, unlike TCP, TLS, or UDP, which are transport protocols. An ICMP packet does not carry application data, but instead is used for diagnostic, control, or error messages. Like UDP, ICMP is a connectionless protocol in that client device 100 does not verify that service instance 104 is capable of receiving data prior to transmitting an ICMP message. To establish session 40 according to ICMP, client device 100 transmits a first packet to service instance 104. Session 40 may be considered "established" according to ICMP upon receipt by client device 100 of any packet from service instance 104, which implies that service instance 104 successfully received the first packet from client device 100, responded, and client device 100 was able to receive the response from service instance 104. Additional example information regarding ICMP is described in "INTERNET CONTROL MESSAGE PROTOCOL," RFC 792, IETF, September 1981, available at https://tools.ietf.org/html/rfc792, the entire contents of which are incorporated herein by reference.

In the example of FIG. 1, when router 110A receives a packet for the forward packet flow originating from client device 100 and destined for server 103, router 110A determines whether the packet belongs to a new session (e.g., is the "first" packet or "lead" packet of session 40). In some examples, router 110A determines whether a source address, source port, destination address, destination port, and protocol of the first packet matches an entry in a session table.

If no such entry exists, router 110A determines that the packet belongs to a new session and creates an entry in the session table. Furthermore, if the packet belongs to a new session, router 110A may generate a session identifier for session 40. The session identifier may comprise, e.g., a source address and source port of client device 100, a destination address and destination port of server 103, and a protocol used by the first packet. Router 110A may use the session identifier to identify subsequent packets as belonging to the same session.

In some examples, routers 110 perform stateful routing for session 40. This means that routers 110 forward each packet of the forward packet flow of session 40 sequentially and along the same forward network path. As described herein, the "same" forward path means the same routers 110 that form a segment or at least a portion between a device originating the packet and a device to which the packet is destined (and not necessarily the entire network path between the device originating the packet and the device to which the packet is destined). Further, routers 110 forward each packet of the return flow of session 40 sequentially and along the same return network path. The forward network path for the forward packet flow of session 40 and the return network path of the return flow of session 40 may be the same path, or different paths. By ensuring that each packet of a flow is forwarded sequentially and along the same path, routers 110 maintain the state of the entire flow at each router 110, thereby enabling the use of stateful packet services, such as Deep Packet Inspection (DPI).

In the example of FIG. 1, a stateful routing session may be established from ingress router 110A through intermediate routers 110C-110H to egress router 110I. In this example, router 110A determines that the first packet is an unmodified packet and the first packet of new session 40. Router 110A modifies the first packet to include metadata specifying the session identifier (e.g., the original source address, source port, destination address, and destination port). Router 110A replaces the header of the modified first packet to specify a source address that is an address of router 110A, a source port that is a port via which router 110A forwards the modified first packet toward server 103, a destination address that is an address of the next hop to which router 110A forwards the first packet (e.g., an address of router 110D), and a destination port that is a port of the next hop to which router 110A forwards the first packet (e.g., a port of router 110D).

Router 110A may further identify a network service associated with session 40. For example, router 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, router 110A may determine that the forward packet flow of session 40 specifies a destination address and destination port assigned to service instance 104 of server 103, which is an instance of a particular network service. Router 110A may thereafter store an association between session 40 with the identified network service. As another example, if the source port and/or destination port for session 40 is 80, router 110A may determine that session 40 is associated with an HTTP service. In other examples, router 110A may determine that one or more of a source address, source port, destination address, or destination port for session 40 belong to a block of address or ports indicative that a particular service is associated with session 40.

In some examples, router 110A uses the determined network service for session 40 to select a forward path for forwarding the first packet and each subsequent packet of the forward packet flow of session 40 toward server 103. In this fashion, router 110A may perform service-specific path selection to select a network path that best suits the requirements of the service. In contrast to a network topology that uses an SDN controller to perform path selection, each router 110 performs path selection. Further, the use of session-based routing enables each router 110 to make routing decisions at the service- or application-level, in contrast to conventional routers that are only able to make routing decisions at the flow level.

Router 110A forwards the modified first packet to router 110D. Additionally, router 110A stores the session identifier for session 40 such that, upon receiving subsequent packets for session 40, router 110A may identify the subsequent packets as belonging to the same session 40 and forward the subsequent packets along the same path as the first packet.

Intermediate router 110D receives the modified first packet and determines whether the modified first packet includes metadata specifying the session identifier. In response to determining that the modified first packet includes metadata specifying the session identifier, intermediate router 110D determines that router 110D is not an ingress device such that router 110D does not attach metadata specifying the session identifier.

As described above with respect to router 110A, router 110D determines whether the packet belongs to a new session (e.g., is the "first" packet or "lead" packet of the session) by determining whether a source address, source port, destination address, destination port, and protocol of the first packet matches an entry in a session table. If no such entry exists, router 110D determines that the packet belongs to a new session and creates an entry in the session table. Furthermore, if the packet belongs to a new session, router 110D generates a session identifier for the session. The session identifier used by router 110D to identify the session for the first packet may be different from the session identifier used by router 110A to identify the same session for the first packet, because each router 110A, 110D uses the header source address, source port, destination address, and destination port of the first packet to generate the session identifier, and this header information may be modified by each preceding router 110 as each router 110 forwards the first packet along the forward path. Furthermore, each router 110 may store this header information to identify a previous router 110 (or "waypoint") and a next router 110 (or "waypoint") such that each router 110 may reconstruct the same forward path and reverse path for each subsequent packet of the session.

Router 110D replaces the header of the modified first packet to specify a source address that is an address of router 110D, a source port that is a port via which router 110D forwards the modified first packet toward server 103, a destination address that is an address of the next hop to which router 110D forwards the first packet (e.g., an address of router 110E for session 40 along the first path), and a destination port that is a port of the next hop to which router 110D forwards the first packet (e.g., a port of router 110E). Router 110D forwards the modified first packet to router 110D. Additionally, router 110D stores the session identifier for the session such that, upon receiving subsequent packets for the session, router 110D may identify subsequent packets as belonging to the same session and forward the subsequent packets along the same path as the first packet.

Subsequent intermediate routers 110E-110H process the modified first packet in a similar fashion as routers 110A and 110D such that routers 110 forward the subsequent packets of the session along the same path as the first packet. Further, each router 110 stores a session identifier for the session, which may include an identification of the previous router 110 along the network path. Thus, each router 110 may use the session identifier to forward packets of the reverse packet flow for the session along the same network path back to client device 100.

A router 110 that may forward packets for a forward packet flow of the session to a destination for the packet flow is an egress, or "terminus" router. In the foregoing example, router 110I is a terminus router because router 110I may forward packets to CE device 102B for forwarding to server 103. Router 110I receives the modified first packet that comprises the metadata specifying the session identifier (e.g., the original source address, source port, destination address, and destination port). Router 110I identifies the modified first packet as destined for a service terminating at router 110I by determining that the destination source address and destination source port specified in the metadata of the modified lead packet corresponds to a destination reachable by router 110I (e.g., server 103 via CE device 102B). Router 110I recovers the original first packet by removing the metadata from the modified first packet and using the metadata to modify the header of the first packet to specify the original source address, source port, destination address, and destination port. Router 110I forwards the recovered first packet to CE device 102B for forwarding to server 103. The use of session-based routing may therefore form a series of waypoints (e.g., routers 110) interconnected by path "segments" (e.g., end-to-end route vectors between each waypoint).

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

Exchanging Service and Topology State Information

In some examples, to implement session-based routing, each router 110 maintains a local repository of service and topology state information for each other router 110. The service and topology state information includes services reachable from each router 110, as well as a network topology from each router for reaching these services. Each router 110 may transmit changes in the services reachable from the router 110 and/or changes in the network topology for reaching the services from the router to a central repository, e.g., a server. Further, each router 110 may receive service and topology state information for each other router 110 in system 2 from the central repository.

In the foregoing example, router 110A receives a packet, determines session 40 for the forward packet flow comprising the packet, determines a service associated with session 40, and selects a network path for forwarding the packet. Router 110A may use its local copy of the service and topology state information for each router 110 to select the network path for forwarding the packet. For example, router 110A may use the identified service associated with the packet and a network topology for reaching the identified service to select a network path that comports with an SLA requirement or other session performance requirements for the service. Router 110A may then forward the packet and subsequent packets for the forward packet flow of session 40 along the selected path. In this fashion, router 110A may perform service-specific path selection in that router 110 may use criteria specific to the service associated with the packet to select a network path that best suits the requirements of the service.

In some examples, interfaces of routers 110 may be assigned to one or more "neighborhoods." A "neighborhood" is defined as a label applied to an interface of a router 110. The routers 110 within the same neighborhood are capable of forming a peering relationship with one another. For example, each router 110 having an interface to which a neighborhood label is applied is reachable over a Layer-3 network to each other router 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each router 110 maintains a local repository of service and topology state information only for those other routers 110 within the same neighborhood. In some examples, each router 110 maintains a local repository of service and topology state information only for those other routers 110 within the same district of neighborhoods. As an example, each service provider network 150 may be considered to be a different "district," wherein each subdomain within each service provider network 150 may be considered to be a neighborhood within that district. In this example, each router 110A and 110B within service provider network 150A may maintain service and topology state information only for one another, and not for routers 110C-110I. Similarly, each router 110D and 110C within service provider network 150B may maintain service and topology state information only for one another, and not for routers 110A-110B or 110E-110I. In other examples, an administrator may assign one or more service provider networks 150 into one or more districts, one or more neighborhoods, or a combination of districts and neighborhoods as suits the needs of network system 2.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

Session Monitoring Using Metrics of Session Establishment.

In accordance with the techniques of the disclosure, one or more of routers 110 monitor session 40 along the first path between client device 100 and service instance 104 using one or more metrics of the establishment of session 40. The first path comprises, e.g., router 110A, 110D, and 110E-110I. Client device 100 may attempt to establish session 40 with service instance 104 to access a network service instantiated by service instance 104. In this example, session 40 comprises a forward flow originating from client device 100 and destined for service instance 104 and a reverse flow originating from service instance 104 and destined for client device 100. Further, routers 110 transport session 40 via a first path traversing routers 110A, 110D, and 110E-110I. After session 40 is established, routers 110 may forward traffic along the forward path and the reverse path between client device 100 and service instance 104. To establish session 40, routers 110 may use communication session protocol, such as TCP, TLS, UDP, or ICMP.

In some examples, router 110A is configured to perform session-based routing for session 40 between client device 100 and service instance 104. For example, router 110A modifies a first packet of at least one of a forward packet flow and a reverse packet flow of session 40 to include a header comprising a source address of router 110A and a destination address of router 110D along the first path and a portion of metadata specifying a session identifier for session 40, as described above. For session 40, router 110D modifies the first packet to include a header comprising a source address of router 110D and a destination address of router 110E along the first path and a portion of metadata specifying a session identifier for session 40, and so on.

In some examples, session 40 may fail to establish, session 40 may originally be established but cease to be established, or session 40 may underperform according to session performance requirements (e.g., SLA requirements). This may occur even where router 110A is unable to identify a problem with its peer network devices (e.g., links 16A, 16B, and interfaces of CE device 102A and router 110D and routers 110 are properly functioning).

As an illustration where session 40 is a TLS session, client device 100 may attempt to establish TLS session 40 with service instance 104. Service instance 104 may successfully complete the key exchange phase and the server parameters phase of the TLS handshake, but fail to complete the authentication phase of the TLS handshake due to instability of link 16D between routers 110D and 110E. Thus, session 40 between client device 100 and service instance 104 fails to establish, even though router 110A is not able to identify a problem at the link, network, or transport levels (e.g., OSI reference model Layers 2, 3, or 4) with its peer network devices (e.g., links 16A, 16B, and interfaces of CE device 102A and router 110D and routers 110 are properly functioning). Typically, a router may be unable to detect problems at the session level (e.g., OSI reference model Layer 5), and therefore may be unable to reroute network traffic at the session level where the links and interfaces to a next hop is properly operating. Furthermore, rerouting traffic at Layers 2, 3, or 4, e.g., by terminating path 16B to router 110D, may disrupt other sessions that share path 16B (or a same interface of router 110A) with session 40 but remain operable.

In accordance with the techniques of the disclosure, router 110A generates one or more metrics of session establishment of session 40. Router 110A obtains session establishment metrics and uses such metrics to determine whether session 40 does not meet session performance requirements. Furthermore, router 110A may use the session metrics and session performance requirements to determine whether to switch the network traffic for session 40 between client device 100 and service instance 104 from a first path to a second path so as to ensure compliance with the session performance requirements without disrupting other, operable sessions that share the same interface or path as underperforming session 40.

For example, router 110A obtains session establishment metrics for session 40 between client device 100 and service instance 104. The session establishment metrics describe data related to the successful or unsuccessful establishment of session 40. The metrics may describe, e.g., data related to the successful or unsuccessful establishment of session 40. For example, the session establishment metrics may include a time elapsed to establish session 40, a number of times session 40 successfully establishes, a number of times session 40 fails to establish due to timeout, a number of times session 40 fails to establish due to an unreachable destination, a number of times session 40 closes prior to TCP session establishment, or a number of times session 40 closes prior to TLS session establishment, etc. In some examples, the session establishment metrics comprise metrics over a sliding window of time, the length of the sliding window configurable by an administrator. For example, router 110A may monitor a state of session 40 to determine whether a TCP or TLS session handshake completes, or whether a first return packet for a return flow is sent for a UDP or ICMP session. Router 110I may derive the metrics of session establishment by monitoring the performance and/or state of session 40 prior to, during, or after establishment, as described in more detail below. In some examples, router 110A obtains session establishment metrics for multiple sessions between client device 100 and service instance 104. Additional description with regards to monitoring the state of session 40 is provided with respect to FIG. 2.

In some examples, router 110A may receive session performance requirements for session 40. The session performance requirements may be, in some examples, one or more SLA requirements for session 40. In some examples, the one or more session performance requirements specify one or more of: a maximum time permitted to establish the session; a minimum number of times that the session is required to successfully establish for a predetermined number of attempts to establish the session, a maximum number of times the session may fail to establish due to timeout over a predetermined time; a maximum number of times the session may fail to establish due an unreachable destination over a predetermined time; a maximum number of times the session may close prior to TCP session establishment over a predetermined time; or a maximum number of times the session may close prior to TLS session establishment over a predetermined time, etc.

Router 110A compares the session establishment metrics of session 40 to the session performance requirements for session 40. In response to determining that the metrics do not satisfy the session performance requirements for session 40, router 110A selects a second path comprising routers 110A, 110C, and 110E-110I for forwarding the network traffic for session 40 between the client device and the network service instance (depicted in FIG. 1 as session 40'). In some examples where session 40 successfully establishes but does not comply with SLA requirements, router 110A may continue to use the first path to forward network traffic for session 40 between client device 100 and network service instance 104 prior to transferring session 40 to the second path as session 40'. After switching to use of the second path, router 110A forward network traffic for session 40' between client device 100 and network service instance 104B.

In some examples, router 110A is configured to perform session-based routing for session 40' between client device 100 and service instance 104. For example, router 110A modifies a second packet of at least one of the forward packet flow and the reverse packet flow of session 40' to include a header comprising a source address of router 110A and a destination address of router 110D along the second path and a portion of metadata specifying the session identifier for session 40', as described above. For session 40', router 110C modifies the second packet to include a header comprising a source address of router 110C and a destination address of router 110E along the second path and a portion of metadata specifying a session identifier for session 40', and so on.

As depicted in the example of FIG. 1, a single service instance 104 is hosted by server 103. In other examples not depicted in FIG. 1, a plurality of servers 103 each may host multiple service instances of the same or different service types. In some examples, at least one of a forward path, a reverse path, or an interface of a router 110 associated with the first path traversed by session 40 is different from at least one of a forward path, a reverse path, or an interface of a router 110 associated with the second path traversed by session 40'.

In the example of FIG. 1, ingress router 110A generates session establishment metrics and performs traffic engineering based on such session establishment metrics as described above. However, in other examples, other routers, such as intermediate routers 110D-110H or egress router 110I may additionally or alternatively generate session establishment metrics and perform traffic engineering and path selection based on session establishment metrics in accordance with the techniques of the disclosure.

In some examples, router 110A removes the first path which transports network traffic for session 40 from inclusion in a session load balancer that load balances customer traffic associated with the network service to different paths. For example, the session load balancer may include a plurality of paths between ingress network device 110A and egress network device 110I. Upon receiving a request from a client to provide the client with access to a network service instantiated by service instance 104, the session load balancer selects an available path through service provider network(s) 150 with which to connect client device 100 to service instance 104. By removing the first path from inclusion in the session load balancer, router 110A may avoid assigning client device 100 to path that does not satisfy SLA requirements for session 40. In some examples, router 110A may use session establishment metrics to select one or more sessions, detect blackholing of traffic, determine that a session does not satisfy SLA requirements, or to load balance customer traffic associated with a network service across different sessions.

The techniques of the disclosure may enable router 110A to monitor the state of session 40 and generate metrics related to establishment of session 40. Router 110A may use such metrics to perform path selection and routing at the session level (e.g., OSI reference model Layer 5), as opposed to other routers which may be only able to perform path selection and routing at the link, network, or transport levels (e.g., OSI reference model Layers 2, 3, or 4). Accordingly, router 110A may provide more efficient and granular routing of customer traffic within network system 2.

Additionally, router 110A may use metrics of session establishment to determine whether session 40 satisfies SLA requirements, and in response, select a different path or interface for transporting network traffic associated with session 40 (e.g., session 40'), so as to ensure compliance with the SLA. Router 110A may therefore detect networking problems at the session level, (e.g., OSI reference model Layer 5), even where router 110A is unable to detect a problem with an interface or path at the link, network, or transport levels (e.g., OSI reference model Layers 2, 3, or 4), and perform actions to ensure compliance with session-level SLA requirements.

Figure 2:
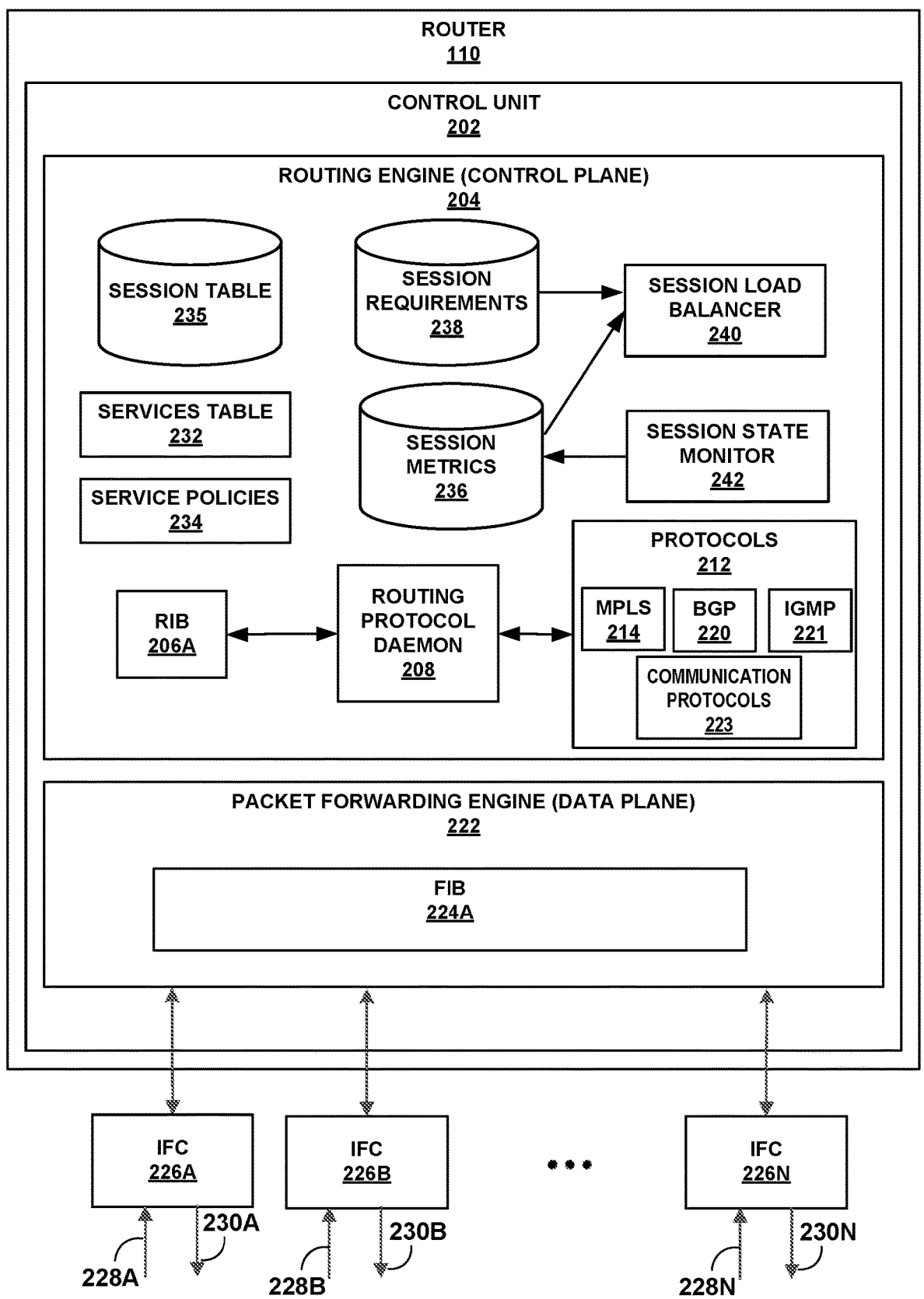
FIG. 2 is a block diagram illustrating an example router in accordance with the techniques of the disclosure.

FIG. 2 is a block diagram illustrating example router 110 in accordance with the techniques of the disclosure. In general, router 110 may be an example of one of routers 110 of FIG. 1. In this example, router 110 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Router 110 also includes a control unit 202 that determines routes of received packets and forwards the packets accordingly via IFCs 226.

Control unit 202 may comprise routing engine 204 and packet forwarding engine 222. Routing engine 204 operates as the control plane for router 110 and includes an operating system that provides a multi-tasking operating environment for execution of a number of concurrent processes. Routing engine 204 communicates with other routers, e.g., such as routers 110 of FIG. 1, to establish and maintain a computer network, such as computer network system 2 of FIG. 1, for transporting network traffic between one or more customer devices. Routing protocol daemon (RPD) 208 of routing engine 204 executes software instructions to implement one or more control plane networking protocols 212. For example, protocols 212 may include one or more routing protocols, such as Border Gateway Protocol (BGP) 220, for exchanging routing information with other routing devices and for updating routing information base (RIB) 206, Multiprotocol Label Switching (MPLS) protocol 214, and Internet Group Management Protocol (IGMP) 221. Protocols 212 may further include one or more communication protocols, such as TCP, UDP, TLS, or ICMP.

RIB 206 may describe a topology of the computer network in which router 110 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for forwarding engine 222, stored in Forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session table 235 stores information for identifying sessions. For example, services table 232 comprises one or more entries that specify a session identifier. In some examples, the session identifier comprises one or more of a source address, source port, destination address, destination port, or protocol associated with a forward flow and/or a reverse flow of the session. As described above, when routing engine 204 receives a packet for a forward packet flow originating from client device 100 and destined for server 103 of FIG. 1, routing engine 204 determines whether the packet belongs to a new session (e.g., is the "first" packet or "lead" packet of session 40). To determine whether the packet belongs to a new session, routing engine 204 determines whether session table 235 includes an entry corresponding to a source address, source port, destination address, destination port, and protocol of the first packet. If an entry exists, then the session is not a new session. If no entry exists, then the session is new and routing engine 204 generates a session identifier for the session and stores the session identifier in session table 235. Routing engine 204 may thereafter use the session identifier stored in session table 235 for the session to identify subsequent packets as belonging to the same session.

Services table 232 stores information that routing engine 204 may use to identify a service associated with a session. For example, services table 232 comprises one or more entries that specify a service identifier and one or more of a source address, source port, destination address, destination port, or protocol associated the service. In some examples, routing engine 204 may query services table 232 with one or more of a source address, source port, destination address, destination port, or protocol of a session for a received packet to determine a service associated with a session. For example, routing engine 204 may determine a service identifier based on a correspondence of a source address, source port, destination address, destination port, or protocol in services table 232 to a source address, source port, destination address, destination port, or protocol specified by a session identifier. Routing engine 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing engine 204 applies, to the packet, the one or more service policies 234 that correspond to the service associated with the packet.

In accordance with the techniques of the disclosure, routing engine 204 generates metrics 236 for the establishment of sessions between client device 100 of FIG. 1 and one or more service instances 104 of servers 103 of FIG. 1. Routing engine 204 may use metrics 236 for session establishment to select one or more sessions, detect blackholing of traffic, determine that a session does not satisfy SLA requirements, to load balance customer traffic associated with the network service across different paths, or to perform path selection, etc.

For example, routing engine 204 receives session performance requirements 238 for session 40 of FIG. 1 between client device 100 and network service instance 104. In some examples, session performance requirements 238 may include one or more SLA requirements for session 40. In some examples, routing engine 204 receives session performance requirements 238 from an administrator or orchestration device, such as a Software-Defined Networking (SDN) controller.

In some examples, the one or more session performance requirements specify one or more of: a maximum time permitted to establish the session; a minimum number of times that the session is required to successfully establish for a predetermined number of attempts to establish the session; a maximum number of times the session may fail to establish due to timeout over a predetermined time; a maximum number of times the session may fail to establish due an unreachable destination over a predetermined time; a maximum number of times the session may close prior to TCP session establishment over a predetermined time; or a maximum number of times the session may close prior to TLS session establishment over a predetermined time, etc.

Routing engine 204 forwards, via IFC 226A, network traffic associated with session 40 between client device 100 and network service instance 104 along a first path. Examples of sessions include a TCP session, a TLS session, a UDP session, an ICMP session, etc. Routing engine 204 obtains metrics 236 of the establishment of session 40. In some examples, session state monitor 242 of routing engine 204 monitors a state of session 40 to determine whether session 40 successfully establishes. For example, session state monitor 242 may monitor a state of session 40 to determine whether a TCP or TLS session handshake completes, or whether a first return packet for a return flow is sent for a UDP or ICMP session. In some examples, routing engine 204 may derive the metrics of session establishment by monitoring, via session state monitor 242, the performance and/or state of session 40 prior to, during, or after establishment.

The metrics may describe, e.g., data related to the successful or unsuccessful establishment of session 40, and/or the performance of the session (e.g., latency, jitter, packet loss, etc.). For example, the session establishment metrics may include a time elapsed to establish session 40, a number of times session 40 successfully establishes, a number of times session 40 fails to establish due to timeout, a number of times session 40 fails to establish due to an unreachable destination, a number of times session 40 closes prior to TCP session establishment, or a number of times session 40 closes prior to TLS session establishment, etc. In some examples, the session establishment metrics comprise metrics over a sliding window of time, the length of the sliding window configurable by an administrator.

A key indicator of service instance performance is a time required to establish a TCP session between, e.g., client device 100 and server 103 hosting service instance 104. This session establishment metric is effectively a time required for client device 100 or service instance 104 to receive a first data packet after the session is established. This metric may provide more useful information for routing decisions than a packet transmission rate because the time required to establish the TCP session is both directional and end-to-end. Importantly, routing engine 204 may use this information as a measure of SLA compliance to influence path selection by routing engine 204.

Routing engine 204 creates and gathers session establishment metrics on a per service, per interface, per destination, and/or per traffic-class basis. This level of granularity provides more accurate information on how network treatment and performance by routing engine 204 impacts application behavior. In some examples, routing engine 204 collects session establishment metrics in protocol based buckets, such as TCP, UDP, ICMP, and TLS. Each protocol has its own determination of what qualifications need to be met for a session to become established, as described above. In turn, routing engine 204 applies protocol- and/or application-specific handling of each of these types of sessions which are defined by what is considered established.

In accordance with the techniques of the disclosure, session state monitor 242 of routing engine 204 monitors a state of each session according to the protocol of the session. For example, session state monitor 242 is capable of determining a state of each session according to a state machine for the relevant protocol to determine whether or not the session has established. Routing engine 204 generates the session establish metrics based on various data related to the establishment of the session (or failure to establish the session).

For example, as described above, to establish a TCP session such that data may be exchanged according to TCP, client device 100 and service instance 104, for example, perform a three-way TCP handshake. Client device 100 sends a first packet (transported by router 110) comprising a "SYN" flag to service instance 104. Service instance 104 acknowledges receipt of the first packet by responding to client device 100 with a second packet comprising a "SYN-ACK" flag (transported by router 110). Client device 100 acknowledges receipt of the second packet by responding to service instance 104 with a third packet comprising an "ACK" flag. After sending the third packet, the TCP session is established such that client device 100 and service instance 104 may exchange data with one another via the TCP session. In further accordance with TCP, in response to each packet sent from client device 100 to service instance 104, service instance 104 responds with an acknowledgement packet (and vice versa). Session state monitor 242 monitors the state of the TCP handshake performed by client device 100 and service instance 104 to monitor the progress of the TCP handshake. Session state monitor 242 determines that the TCP session is established when session state monitor 242 detects an acknowledgement of a first packet that contains a data payload from, e.g., one of client device 100 and service instance 104, after session state monitor 242 determines that client device 100 and service instance 104 have completed the TCP handshake for the session. The time required to detect the acknowledgement of the first packet that contains the data payload after client device 100 and service instance 104 have completed the TCP handshake for the session is referred to herein as a "time to first data packet" for the TCP session.

In some examples, session state monitor 242 models a state machine of the TCP protocol to monitor the progression of establishment of the TCP session. In some examples, session state monitor 242 determines one or more of a time to first data packet for the TCP session, a minimum time to reach the established state for the TCP session, a maximum time to reach the established state for the TCP session, a mean time to reach the established state for the TCP session, a count of how many TCP sessions reach the established state, a count of how many TCP sessions fail to establish due to time out, a count of how many TCP sessions fail to establish due to destination unreachable, or a count of how many TCP sessions close prior to establishment.

As another example, to establish a TLS session such that data may be exchanged according to TLS, client device 100 and service instance 104 perform a three-way TLS handshake comprising the key exchange phase, the server parameters phase, and the authentication phase. Session state monitor 242 monitors the state of the TLS handshake performed by client device 100 and service instance 104 to monitor the progress of the TLS handshake. Session state monitor 242 determines that the TLS session is established when session state monitor 242 detects an acknowledgement of a first packet that contains a data payload from, e.g., one of client device 100 and service instance 104, after session state monitor 242 determines that client device 100 and service instance 104 have completed the TLS handshake for the session (e.g., a "time to first data packet"). The time required to detect the acknowledgement of the first packet that contains the data payload after client device 100 and service instance 104 have completed the TLS handshake for the session is referred to herein as a "time to first data packet" for the TLS session.

In some examples, session state monitor 242 models a state machine of the TLS protocol to monitor the progression of establishment of the TLS session. In some examples, session state monitor 242 determines one or more of a time to first data packet for the TLS session, a minimum time to reach the established state for the TLS session, a maximum time to reach the established state for the TLS session, a mean time to reach the established state for the TLS session, a count of how many TLS sessions reach the established state, a count of how many TLS sessions fail to establish due to time out, a count of how many TLS sessions fail to establish due to destination unreachable, or a count of how many TLS sessions close prior to establishment.

As another example, for a UDP session between client device 100 and service instance 104, session state monitor 242 identifies a first UDP packet for the session originating from client device 100 and destined for service instance 104. Session state monitor 242 may consider the UDP session to be established in response to detecting a packet for the session sent along a reverse path (e.g., originating from service instance 104 and destined for client device 100). The presence of traffic along the reverse path implies that service instance 104 successfully received the first UDP packet from client device 100 and responded.

In some examples, session state monitor 242 models a state machine of the UDP protocol to monitor the progression of establishment of the UDP session. In some examples, session state monitor 242 determines one or more of a time to first data packet for the UDP session, a minimum time to reach the established state for the UDP session, a maximum time to reach the established state for the UDP session, a mean time to reach the established state for the UDP session, a count of how many UDP sessions reach the established state, a count of how many UDP sessions fail to establish due to time out, or a count of how many UDP sessions fail to establish due to destination unreachable.

As another example, for an ICMP session between client device 100 and service instance 104, session state monitor 242 identifies a first ICMP packet for the session originating from client device 100 and destined for service instance 104. Session state monitor 242 may consider the ICMP session to be established in response to detecting a packet for the session sent along a reverse path (e.g., originating from service instance 104 and destined for client device 100). The presence of traffic along the reverse path implies that service instance 104 successfully received the first ICMP packet from client device 100 and responded.

In some examples, session state monitor 242 models a state machine of the ICMP protocol to monitor the progression of establishment of the ICMP session. In some examples, session state monitor 242 determines one or more of a time to first data packet for the ICMP session, a minimum time to reach the established state for the ICMP session, a maximum time to reach the established state for the ICMP session, a mean time to reach the established state for the ICMP session, a count of how many ICMP sessions reach the established state, a count of how many ICMP sessions fail to establish due to time out, or a count of how many ICMP sessions fail to establish due to destination unreachable.

In some examples, the session establishment metrics generated by routing engine 204 include a time to a first data packet for a session. For example, for a TCP session, this metric specifies a time required for client device 100 or service instance 104 to receive an acknowledgement of a first data packet after a TCP handshake is completed. As another example, for a TLS session, this metric specifies a time required for client device 100 or service instance 104 to receive an acknowledgement of a first data packet after a TLS handshake is completed. For a UDP session, this metric specifies a time required for client device 100 or service instance 104 to receive a first data packet along a return path of the UDP session. For an ICMP session, this metric specifies a time required for client device 100 or service instance 104 to receive a first data packet along a return path of the ICMP session.

In some examples, the session establishment metrics generated by routing engine 204 include a time to establish a session. This metric may include a minimum time to establish the session, a maximum time to establish the session, and a mean time to establish the session. The time from session start to when the session reaches an established state is defined per-protocol, as described above. In some examples, for a TLS session, the time to establish a session is calculated from a TCP establishment start time instead of from a session start time.

An example of a session establishment metric generated by routing engine 204 and specifying a time to establish a session is set forth below:

admin@t116-dut1.t116 #show stats highway destination-reachability tcp time-to-establishment
Tue 2020-03-31 20:33:26 UTC
Retrieving statistics . . . .
time-to-establishment

| Metric | Node | Service | Network-interface | Destination-prefix | Traffic-class | Value |
|---|---|---|---|---|---|---|
| max | t116-dut1 | foo | controlKniIf | 192.168.56.51 | best-effort | 0 |
|  | t116-dut1 | foo | controlKniIf | 192.168.56.51 | high | 0 |
|  | t116-dut1 | foo | controlKniIf | 192.168.56.51 | low | 0 |
|  | t116-dut1 | foo | controlKniIf | 192.168.56.51 | medium | 0 |
| min | t116-dut1 | foo | controlKniIf | 192.168.56.51 | best-effort | 0 |
|  | t116-dut1 | foo | controlKniIf | 192.168.56.51 | high | 0 |
|  | t116-dut1 | foo | controlKniIf | 192.168.56.51 | low | 0 |
|  | t116-dut1 | foo | controlKniIf | 192.168.56.51 | medium | 0 |

Completed in 0.02 seconds

An example of a session establishment metric generated by routing engine 204 and specifying a maximum time to establish a session is set forth below:

admin@t116-dut1.t116 #show stats highway destination-reachability tcp time-to-establishment max Tue 2020-03-31 20:39:12 UTC
Retrieving statistics . . . .
Maximum time to establishment

| Node | Service | Network-interface | Destination-prefix | Traffic-class | Value |
|---|---|---|---|---|---|
| t116-dut1 | foo | controlKniIf | 192.168.56.51 | best-effort | 0 |
| t116-dut1 | foo | controlKniIf | 192.168.56.51 | high | 0 |
| t116-dut1 | foo | controlKniIf | 192.168.56.51 | low | 0 |
| t116-dut1 | foo | controlKniIf | 192.168.56.51 | medium | 0 |

Completed in 0.02 seconds

An example of a session establishment metric generated by routing engine 204 and specifying a minimum time to establish a session is set forth below:
   admin@t116-dut1.t116 #show stats highway destination-reachability tcp time-to-establishment min
   Tue 2020-03-31 20:39:25 UTC
   Retrieving statistics . . . .
   Minimum time to establishment

| Node | Service | Network-interface | Destination-prefix | Traffic-class | Value |
|---|---|---|---|---|---|
| t116-dut1 | foo | controlKniIf | 192.168.56.51 | best-effort | 0 |
| t116-dut1 | foo | controlKniIf | 192.168.56.51 | high | 0 |
| t116-dut1 | foo | controlKniIf | 192.168.56.51 | low | 0 |
| t116-dut1 | foo | controlKniIf | 192.168.56.51 | medium | 0 |

Completed in 0.02 seconds

In some examples, the session establishment metrics generated by routing engine 204 include a number of sessions that reach establishment. The number of sessions that reach establishment is a count of how many sessions reach the established state, defined on a per-protocol basis as described above. In some examples, the number of sessions that reach establishment is a number of sessions that reach establishment over a predetermined amount of time.

An example of a session establishment metric generated by routing engine 204 and specifying a number of sessions that reach establishment is set forth below:
   admin@t116-dut1.t116 #show stats highway destination-reachability tcp established
   Tue 2020-03-31 20:38:29 UTC
   Retrieving statistics . . . .
   TCP sessions that were successfully established

| Node | Service | Network-interface | Destination-prefix | Traffic-class | Value |
|---|---|---|---|---|---|
| t116-dut1 | foo | controlKniIf | 192.168.56.51 | best-effort | 0 |
| t116-dut1 | foo | controlKniIf | 192.168.56.51 | high | 0 |
| t116-dut1 | foo | controlKniIf | 192.168.56.51 | low | 0 |
| t116-dut1 | foo | controlKniIf | 192.168.56.51 | medium | 0 |

In some examples, the session establishment metrics generated by routing engine 204 include a number of sessions that time out before establishing. The number of sessions that time out before establishing is a count of how many sessions time out without ever reaching establishment, defined on a per-protocol basis as described above. In some examples, the number of sessions that time out before establishing is a number of sessions that time out before establishing over a predetermined amount of time. In some examples, the TLS bucket of this metric is incremented only when the TCP established state has been reached but before the TLS established state has been reached.

An example of a session establishment metric generated by routing engine 204 and specifying a number of sessions that time out before establishing is set forth below:
   admin@t116-dut1.t116 #show stats highway destination-reachability tcp timeout-before-establishment
   Tue 2020-03-31 20:40:21 UTC
   Retrieving statistics . . . .
   Timed out TCP sessions before establishment

| Node | Service | Network-interface | Destination-prefix | Traffic-class | Value |
|---|---|---|---|---|---|
| t116-dut1 | foo | controlKniIf | 192.168.56.51 | best-effort | 0 |
| t116-dut1 | foo | controlKniIf | 192.168.56.51 | high | 0 |
| t116-dut1 | foo | controlKniIf | 192.168.56.51 | low | 0 |
| t116-dut1 | foo | controlKniIf | 192.168.56.51 | medium | 0 |

Completed in 0.02 seconds

In some examples, the session establishment metrics generated by routing engine 204 include a number of sessions that fail to establish due to an unreachable destination. The number of sessions that fail to establish due to an unreachable destination is a count of how many sessions could not complete because the destination was unreachable. In some examples, routing engine 204 determines that the destination is unreachable in response to receiving an ICMP destination message unreachable for the session. In some examples, the number of sessions that time out before establishing is a number of sessions that fail to establish due to an unreachable destination over a predetermined amount of time.

In some examples, this metric may not apply across UDP, ICMP, TCP, TLS, and so may specify the specific protocol or application name of the metric. An example of a session establishment metric generated by routing engine 204 and specifying a number of TCP sessions that sessions that fail to establish due to an unreachable destination is set forth below:
   admin@t116-dut1.t116 #show stats highway destination-reachability tcp unreachable
   Tue 2020-03-31 20:41:06 UTC
   Retrieving statistics . . . .
   TCP unreachable

| Node | Service | Network-interface | Destination-prefix | Traffic-class | Value |
|---|---|---|---|---|---|
| t116-dut1 | foo | controlKniIf | 192.168.56.51 | best-effort | 0 |
| t116-dut1 | foo | controlKniIf | 192.168.56.51 | high | 0 |
| t116-dut1 | foo | controlKniIf | 192.168.56.51 | low | 0 |
| t116-dut1 | foo | controlKniIf | 192.168.56.51 | medium | 0 |

Completed in 0.02 seconds

In some examples, the session establishment metrics generated by routing engine 204 include a number of sessions closed before establishment of a TCP session. This metric may include a number of sessions that are closed by a reset or fin message before the session has finished the TCP handshake and data has been acknowledged. This may occur due to server 103 responding to a SYN from client device 100 with a reset or a proxy message terminating a session that server 103 cannot complete. In some examples, the number of sessions closed before establishment of a TCP session is a number of sessions closed before establishment of a TCP session over a predetermined amount of time.

An example of a session establishment metric generated by routing engine 204 and specifying a number of sessions closed before establishment of a TCP session is set forth below:

admin@t116-dut1.t116 #show stats highway destination-reachability tcp close-before-establishment
    Tue 2020-03-31 20:41:56 UTC
    Retrieving statistics . . . .
    Closed TCP sessions before establishment

| Node | Service | Network-interface | Destination-prefix | Traffic-class | Value |
|---|---|---|---|---|---|
| t116-dut1 | foo | controlKniIf | 192.168.56.51 | best-effort | 0 |
| t116-dut1 | foo | controlKniIf | 192.168.56.51 | high | 0 |
| t116-dut1 | foo | controlKniIf | 192.168.56.51 | low | 0 |
| t116-dut1 | foo | controlKniIf | 192.168.56.51 | medium | 0 |

Completed in 0.02 seconds

In some examples, the session establishment metrics generated by routing engine 204 include a number of sessions closed before establishment of a TLS session. This metric may include a number of sessions that are closed by a reset or fin message after TCP establishment but before the session has finished the TLS handshake and data has been acknowledged. In some examples, the number of sessions closed before establishment of a TLS session is a number of sessions closed before establishment of a TLS session over a predetermined amount of time.

An example of a session establishment metric generated by routing engine 204 and specifying a number of sessions closed before establishment of a TLS session is set forth below:

admin@t116-dut1.t116 #show stats highway destination-reachability tls close-before-establishment
    Tue 2020-03-31 20:42:30 UTC
    Retrieving statistics . . . .
    Closed TIS sessions before establishment

| Node | Service | Network-interface | Destination-prefix | Traffic-class | Value |
|---|---|---|---|---|---|
| t116-dut1 | foo | controlKniIf | 192.168.56.51 | best-effort | 0 |
| t116-dut1 | foo | controlKniIf | 192.168.56.51 | high | 0 |
| t116-dut1 | foo | controlKniIf | 192.168.56.51 | low | 0 |
| t116-dut1 | foo | controlKniIf | 192.168.56.51 | medium | 0 |

Completed in 0.02 seconds

In some examples, to begin collection of service establishment metrics as described above, an administrator configures routing engine 204 with a service route configured to enable reachability detection. An example of such a service route that enables reachability detection is set forth below:

| service-route | |
|---|---|
| name | service-agent1 |
| nat-target | 1.2.3.4 |
| service-name | web |
| service-route-policy | sap1 |
| reachability-detection enabled | true |
| next-hop | |
| node-name | slice1 |
| interface | intf1 |
| gateway-ip | 1.1.1.2 |

In some examples, an administrator configures routing engine 204 to filter reachability by destination prefix by traffic class. An example of such a configuration is set forth below:

admin@t116-dut1.t116 #show stats highway destination-reachability destination-prefix 192.168.56.51 traffic-class best-effort
    Tue 2020-03-31 20:44:47 UTC
    Retrieving statistics . . . .
    Destination Reachability Statistics

| Metric | Node | Service | Network-interface | Destination-prefix | Traffic-class | Value |
|---|---|---|---|---|---|---|
| icmp established | t116-dut1 | foo | controlKniIf | 192.168.56.51 | best-effort | 0 |
| icmp time-to-establishment max | t116-dut1 | foo | controlKniIf | 192.168.56.51 | best-effort | 0 |
| icmp time-to-establishment min | t116-dut1 | foo | controlKniIf | 192.168.56.51 | best-effort | 0 |
| icmp timeout-before-establishment | t116-dut1 | foo | controlKniIf | 192.168.56.51 | best-effort | 0 |
| icmp unreachable | t116-dut1 | foo | controlKniIf | 192.168.56.51 | best-effort | 0 |
| tcp close-before-establishment | t116-dut1 | foo | controlKniIf | 192.168.56.51 | best-effort | 0 |
| tcp established | t116-dut1 | foo | controlKniIf | 192.168.56.51 | best-effort | 0 |
| tcp time-to-establishment max | t116-dut1 | foo | controlKniIf | 192.168.56.51 | best-effort | 0 |
| tcp time-to-establishment min | t116-dut1 | foo | controlKniff | 192.168.56.51 | best-effort | 0 |
| tcp timeout-before-establishment | t116-dut1 | foo | controlKniIf | 192.168.56.51 | best-effort | 0 |
| tcp unreachable | t116-dut1 | foo | controlKniIf | 192.168.56.51 | best-effort | 0 |
| tls close-before-establishment | t116-dut1 | foo | controlKniIf | 192.168.56.51 | best-effort | 0 |
| tls established | t116-dut1 | foo | controlKniIf | 192.168.56.51 | best-effort | 0 |
| tls time-to-establishment max | t116-dut1 | foo | controlKniIf | 192.168.56.51 | best-effort | 0 |
| tls time-to-establishment min | t116-dut1 | foo | controlKniIf | 192.168.56.51 | best-effort | 0 |
| tls timeout-before-establishment | t116-dut1 | foo | controlKniIf | 192.168.56.51 | best-effort | 0 |
| udp established | t116-dut1 | foo | controlKniIf | 192.168.56.51 | best-effort | 0 |
| udp time-to-establishment max | t116-dut1 | foo | controlKniIf | 192.168.56.51 | best-effort | 0 |
| udp time-to-establishment min | t116-dut1 | foo | controlKniIf | 192.168.56.51 | best-effort | 0 |
| udp timeout-before-establishment | t116-dut1 | foo | controlKniIf | 192.168.56.51 | best-effort | 0 |
| udp unreachable | t116-dut1 | foo | controlKniIf | 192.168.56.51 | best-effort | 0 |

Completed in 0.03 seconds

Routing engine 204 compares metrics 236 for session establishment for session 40 to session performance requirements 238 for session 40. In response to determining that metrics 236 for session establishment for session 40 do not satisfy session performance requirements 238 for session 40, routing engine 204 forwards, via IFC 226B, network traffic associated with session 40 between client device 100 and network service instance 104 along a second path as session 40'. In some examples where session 40 successfully establishes but does not comply with session performance requirement 238, routing engine 204 may continue to use IFC 226A to forward network traffic between client device 100 and network service instance 104 prior to switching to forwarding network traffic between client device 100 and network service instance 104 via IFC 226B.

In some examples, routing engine 204 may use metrics 236 for session establishment for session 40 to determine whether latency of network traffic associated with session 40 exceeds session performance requirements 238 or whether blackholing of network traffic associated with session 40 is occurring. For example, if routing engine 204 determines that latency of network traffic associated with session 40 is high, routing engine 204 may maintain the use of the first path over which network traffic for session 40 is forwarded even if session 40 exceeds session performance requirements 238. As another example, if routing engine 204 determines that blackholing of network traffic associated with session 40 is occurring, routing engine 204 may cease forwarding network traffic associated with session 40 over the first path and switch to using the second path to forward the network traffic associated with session 40' between client device 100 and network service instance 104.

In some examples, routing engine 204 may use metrics 236 for session establishment for session 40 to determine whether to include or exclude a path from session load balancer 240. Session load balancer 240 operates to load balance customer traffic associated with a network service across different paths of a plurality of paths, such as the first path and second path over which network traffic for respective sessions 40 and 40' of FIG. 1 are forwarded. By performing load balancing, session load balancer 240 may evenly distribute customer traffic of client device 100 across paths and interfaces, thereby reducing the likelihood that a particular session 40 or a particular router 110 may become overutilized, thereby causing network congestion, or underutilized, thereby allowing available network resources to go unused. For example, if routing engine 204 determines that metrics 236 for session establishment for session 40 do not satisfy session performance requirements 238 for session 40, routing engine 204 may determine that session 40 is overutilized. Routing engine 204 may remove the first path over which network traffic associated with session 40 is forwarded from session load balancer 240 to avoid the first path to forward customer traffic, thereby reducing the likelihood that the customer traffic may not satisfy SLA requirements.

Figure 3A:
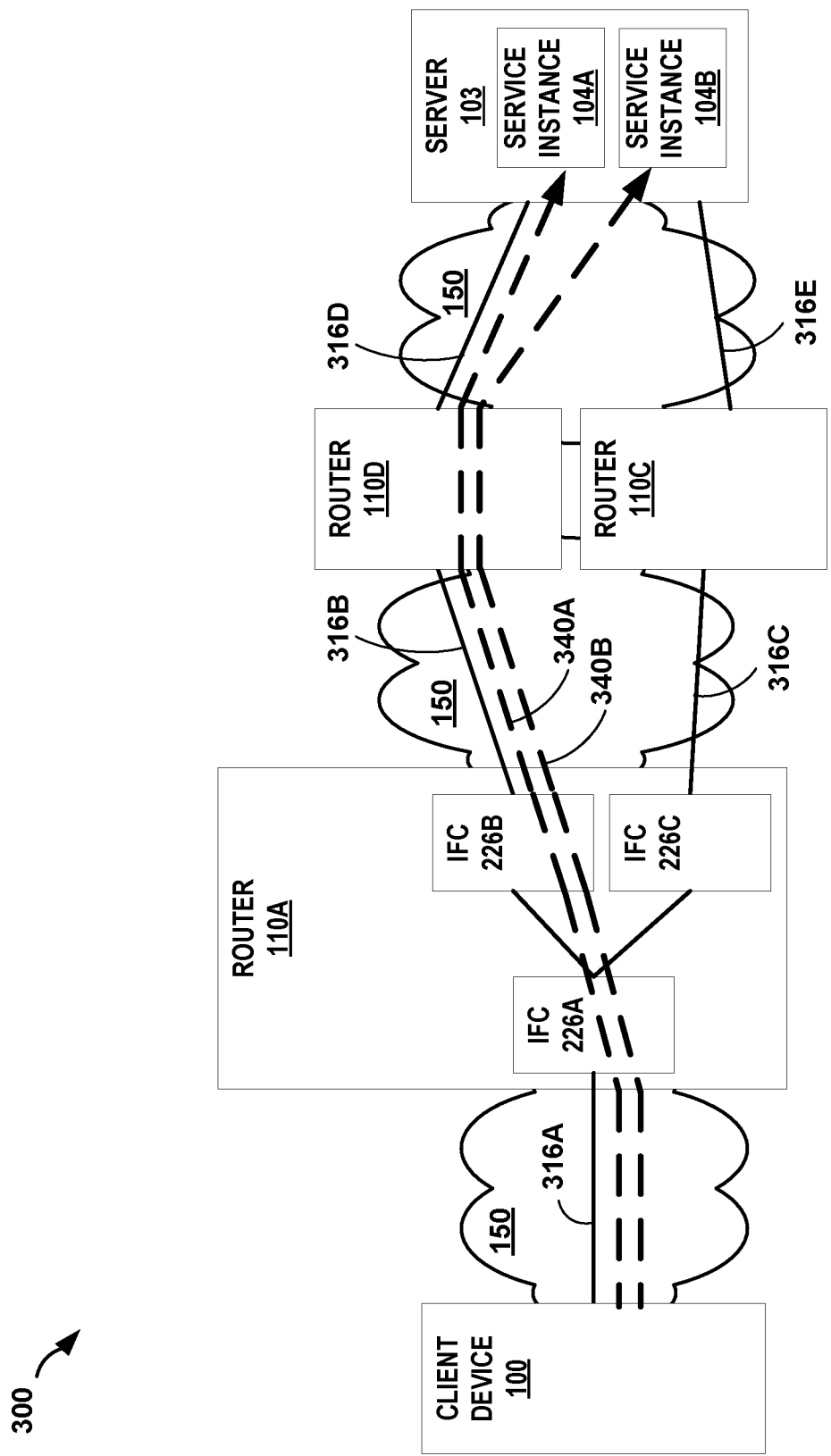
FIGS. 3A and 3B are block diagrams illustrating an example computer network system that performs path selection based on metrics of session establishment in accordance with the techniques of the disclosure.
Figure 3B:
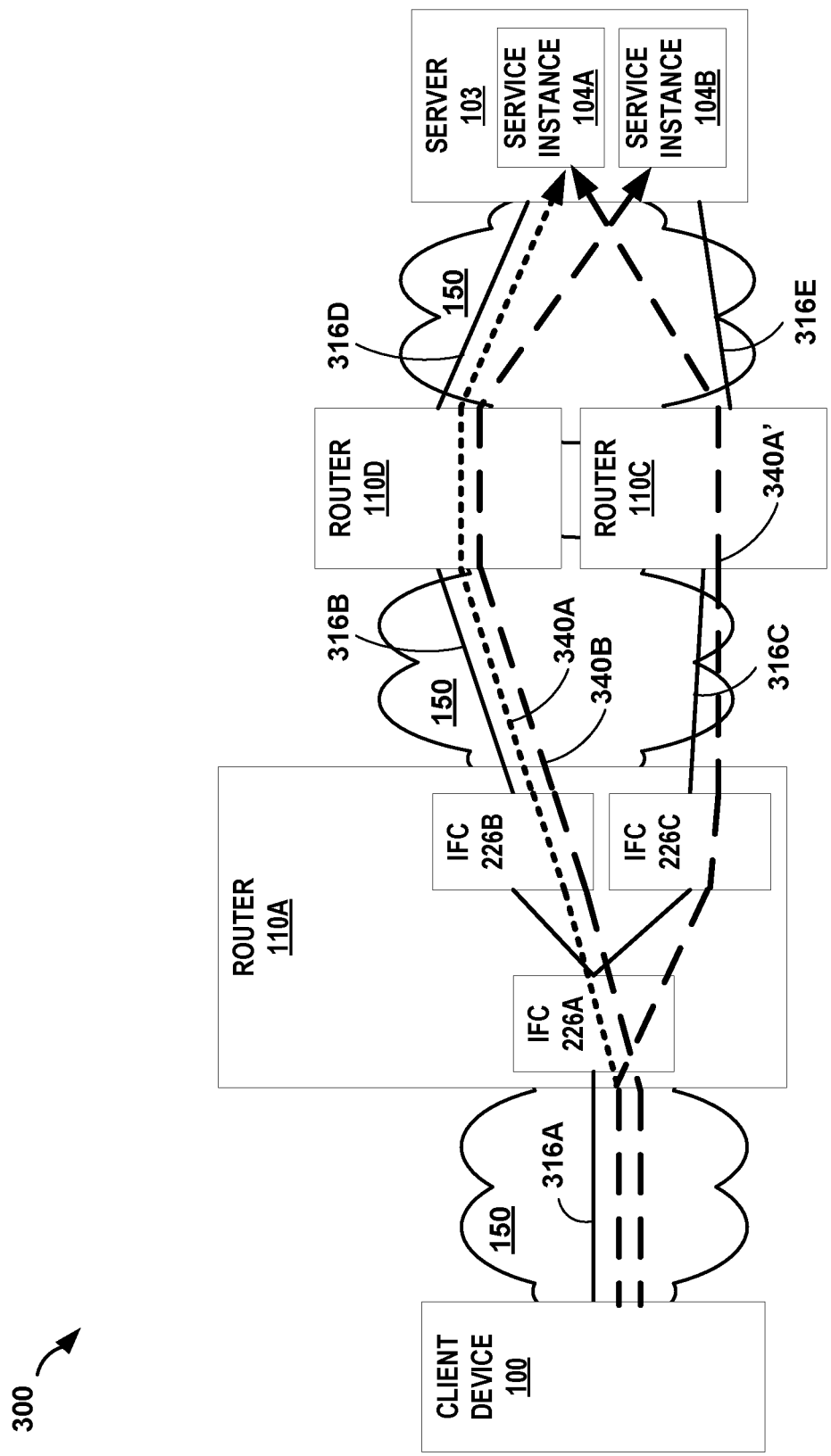

FIGS. 3A and 3B are block diagrams illustrating example computer network system 300 that performs path selection based on metrics of session establishment in accordance with the techniques of the disclosure. FIGS. 3A and 3B are described with respect to FIGS. 1 and 2 for convenience. For example, system 300 may be an example of system 2 of FIG. 1. Routers 110A, 110C, and 110D may be examples of 110A, 110C, and 110D of FIG. 1 or router 110 of FIG. 2. Router 110A includes IFCs 226A-226C (collectively, "IFCs 226").

In the example of FIGS. 3A-3B, server 103 hosts service instance 104A, which instantiates a first network service. Server 103 further hosts service instance 104B, which instantiates a second network service. In some examples, the first network service comprises an HTTP service over a TCP session accessed via port 80 of server 103. In some examples, the second network service comprises a TLS session accessed via port 443 of server 103.

Router 110A is connected to server 103 via a first path comprising link 316B, router 110D, and link 316D and a second path comprising link 316C, router 110C, and link 316E. In some examples, the first path comprises a path across a broadband network. In some examples, the second path comprises a path across a mobile network.

Session 340A comprises a first forward packet flow along a first forward path (e.g., the first path comprising link 316B, router 110D, and link 316D) and a first reverse packet flow along a first reverse path (e.g., link 316D, router 110D, and link 316B) between client device 100 and network service instance 104A hosted by server 103. Session 340B comprises a second forward packet flow along the first path (e.g., link 316A, router 110A, link 316B, router 110D, and link 316D) and a second reverse packet flow along a reverse of the first path between client device 100 and network service instance 104B hosted by server 103. Both session 340A and session 340B ingress via IFC 226A of router 110A and egress via IFC 226B of router 110A.

Router 110A forwards, along the first path comprising link 316A, router 110A, link 326B, router 110D, and link 316D, network traffic for session 340A. In some examples, router 110A perform session-based routing for session 340A between client device 100 and network service instance 104A. For example, router 110A modifies a first packet of at least one of a forward packet flow and a reverse packet flow of session 340A to include a header comprising a source address of router 110A and a destination address of router 110D along the first path and a portion of metadata specifying a session identifier for session 340A.

In the example of FIG. 3A, router 110A receives one or more session performance requirements for session 340A. In some examples, the one or more session performance requirements comprise one or more SLA requirements. In some examples, the one or more session performance requirements specify one or more of: a maximum time permitted to establish session 340A; a minimum number of times that session 340A is required to successfully establish for a predetermined number of attempts to establish session 340A, a maximum number of times session 340A may fail to establish due to timeout over a predetermined time; a maximum number of times session 340A may fail to establish due an unreachable destination over a predetermined time: a maximum number of times session 340A may close prior to TCP session establishment over a predetermined time; or a maximum number of times session 340A may close prior to TLS session establishment over a predetermined time, etc.

Router 110A obtains one or more metrics of session establishment of session 340A. For example, the metrics of session establishment may include, e.g., a time elapsed to establish session 340A, a number of times session 340A successfully establishes, a number of times session 340A fails to establish due to timeout, a number of times session 340A fails to establish due to an unreachable destination, a number of times session 340A closes prior to TCP session establishment, or a number of times session 340A closes prior to TLS session establishment, etc. Router 110A may derive the metrics of session establishment by monitoring the performance and/or state of the first session prior to, during, or after establishment.

Router 110A determines that the one or more metrics of session establishment of session 340A do not satisfy the one or more session performance requirements for session 340A. For example, router 110A may determine that a time elapsed to establish session 340A exceeds a maximum time permitted to establish session 340A as set by an SLA requirement for session 340A. As another example, router 110A may determine that a number of times session 340A fails to establish due to timeout exceeds a maximum number of times session 340A is permitted to establish due to timeout over a predetermined time, as set by an SLA requirement for session 340A.

In some examples, in response to determining that the one or more metrics of session establishment of session 340A do not satisfy the one or more session performance requirements for session 340A, router 110A excludes the first path along which network traffic for session 340A is forwarded from a session load balancer (e.g., session load balancer 240 of FIG. 2). For example, router 110A removes a route specifying that service instance 104 is reachable via the first path comprising link 316A, router 110A, link 316B, router 110D, and link 316D from inclusion in session load balancer 240. Subsequently, when establishing a session between client device 100 and a service instance 104 of the first network service, session load balancer 240 may exclude the first path from a set of paths with which router 110A may use to provide client device 100 with access to service instance 104A of server 103.

As depicted in the example of FIG. 3B, in response to determining that the one or more metrics of session establishment of session 340A do not satisfy the one or more session performance requirements for session 340A, router 110A switches from forwarding network traffic associated with session 340A across the first path (e.g., link 316A, router 110A, link 316B, router 110D, and link 316D) to forwarding network traffic associated with session 340A across a second path (e.g., link 316A, router 110A, link 316C, router 110C, and link 316E) (represented as session 340A' in FIG. 3B). The network traffic of session 340A' ingresses via IFC 226A of router 110A, but egresses via IFC 226C. Router 110A switches from forwarding network traffic associated with session 340A along the first path to forwarding network traffic associated with session 340A' along the second path between client device 100 and network service instance 104A. In some examples, router 110A ceases use of the first path for lack of compliance with the one or more session performance requirements.

In some examples, router 110A perform session-based routing for session 340A' between client device 100 and network service instance 104A. For example, router 110A modifies a second packet of at least one of a forward packet flow and a reverse packet flow of session 340A to include a header comprising a source address of router 110A and a destination address of router 110C along the second path and a portion of metadata specifying a session identifier for session 340A.

Router 110A further receives one or more session performance requirements for session 340B and one or more metrics of session establishment of session 340B. Router 110A determines that the one or more metrics of session establishment of session 340B satisfy the one or more session performance requirements for session 340B. Therefore, because session 340B complies with the session performance requirements for session 340B, when router 110A switches from using the first path for network traffic of session 340A to using the second path for network traffic of session 340A', router 110A may avoid interrupting the forwarding of network traffic associated with session 340B over the first path (e.g., by avoiding disabling IFC 226B or tearing down link 316B).

Therefore, where session 340A is underperforming, the techniques of the disclosure may enable router 110A to switch from the use of the first path over which session 340A is forwarded to the use of a different path or interface (e.g., link 316C and/or IFC 226C), without tearing down path 316B or deactivating IFC 226B associated with underperforming session 340A. Therefore, router 110A may select a different path for network traffic of underperforming session 340A without adversely affecting session 340B, which performs according to SLA requirements but shares link 316B with underperforming session 340A and/or uses the same IFC 226B associated with underperforming session 340A. Thus, router 110A may provide more granular and efficient routing of customer traffic as compared to other routers that may be required to tear down a path or deactivate an interface associated with an underperforming session.

Figure 4:
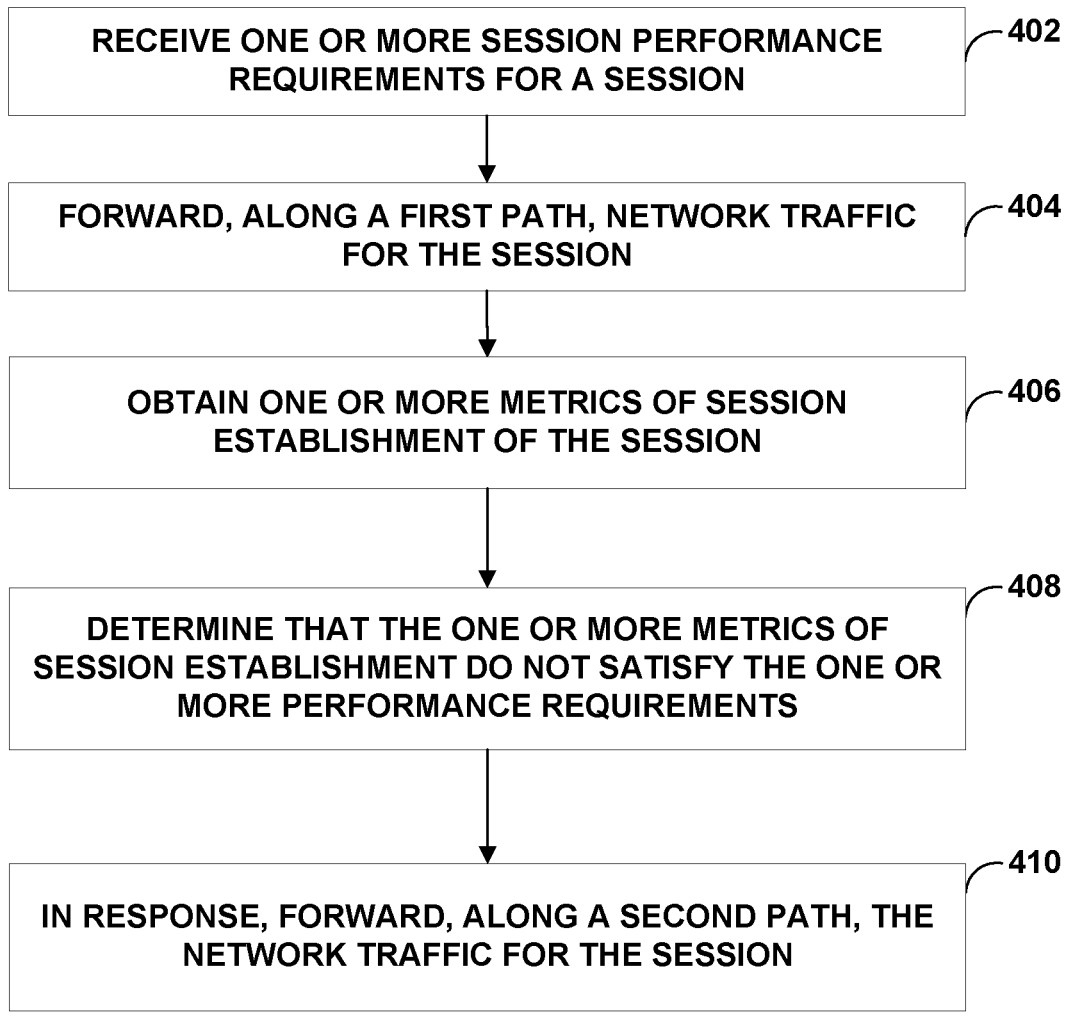
FIG. 4 is a flowchart illustrating an example operation in accordance with the techniques of the disclosure.

FIG. 4 is a flowchart illustrating an example operation in accordance with the techniques of the disclosure. Specifically, FIG. 4 depicts an example for monitoring a session using metrics of session establishment for the session. FIG. 4 is described with respect to router 110A of FIGS. 3A-3B for convenience. However, the operation depicted in FIG. 4 may additionally be implemented by routers 110 of system 2 of FIG. 1 or router 110 of FIG. 2. Session 340A comprises a first forward packet flow along a first forward path and a first reverse packet flow along a first reverse path between client device 100 and network service instance 104 hosted by server 103.

In the example of FIG. 4, router 110A receives one or more session performance requirements for session 340A between client device 100 and network service instance 104 hosted by server 103 (402). In some examples, the one or more session performance requirements comprise one or more SLA requirements. In some examples, the one or more session performance requirements specify one or more of: a maximum time permitted to establish session 340A; a minimum number of times that session 340A is required to successfully establish for a predetermined number of attempts to establish session 340A, a maximum number of times session 340A may fail to establish due to timeout over a predetermined time; a maximum number of times session 340A may fail to establish due an unreachable destination over a predetermined time; a maximum number of times session 340A may close prior to TCP session establishment over a predetermined time, or a maximum number of times session 340A may close prior to TLS session establishment over a predetermined time, etc.

Router 110A forwards, along a first path comprising link 316A, router 110A, link 326B, router 110D, and link 316D, network traffic for session 340A (404). In some examples, router 110A perform session-based routing for session 340A between client device 100 and network service instance 104A. For example, router 110A modifies a first packet of at least one of a forward packet flow and a reverse packet flow of session 340A to include a header comprising a source address of router 110A and a destination address of router 110D along the first path and a portion of metadata specifying a session identifier for session 340A.

Router 110A obtains one or more metrics of session establishment of session 340A (406). For example, the metrics of session establishment may include, e.g., a time elapsed to establish session 340A, a number of times session 340A successfully establishes, a number of times session 340A fails to establish due to timeout, a number of times session 340A fails to establish due to an unreachable destination, a number of times session 340A closes prior to TCP session establishment, or a number of times session 340A closes prior to TLS session establishment, etc. Router 110A may derive the metrics of session establishment by monitoring the performance and/or state of the first session prior to, during, or after establishment.

Router 110A determines that the one or more metrics of session establishment of session 340A do not satisfy the one or more session performance requirements for session 340A (408). For example, router 110A may determine that a time elapsed to establish session 340A exceeds a maximum time permitted to establish session 340A as set by an SLA requirement for session 340A. As another example, router 110A may determine that a number of times session 340A fails to establish due to timeout exceeds a maximum number of times session 340A is permitted to establish due to timeout over a predetermined time, as set by an SLA requirement for session 340A.

In response to determining that the one or more metrics of session establishment of session 340A do not satisfy the one or more session performance requirements for session 340A, router 110 forwards, along a second path comprising link 316A, router 110A, link 326C, router 110C, and link 316E, network traffic for session 340A (depicted as session 340A' in FIGS. 3A-3B) (410). In some examples, router 110A perform session-based routing for session 340A' between client device 100 and network service instance 104A. For example, router 110A modifies a second packet of at least one of a forward packet flow and a reverse packet flow of session 340A to include a header comprising a source address of router 110A and a destination address of router 110C along the second path and a portion of metadata specifying a session identifier for session 340A.

In some examples, in response to determining that the one or more metrics of session establishment of session 340A do not satisfy the one or more session performance requirements for session 340A, router 110A optionally excludes the first path from a session load balancer (e.g., session load balancer 240 of FIG. 2). For example, router 110A removes the first path from inclusion in session load balancer 240. Subsequently, when selecting a path for a session between client device 100 and service instance 104, session load balancer 240 may exclude the first path comprising link 316A, router 110A, link 326B, router 110D, and link 316D from a set of paths with which router 110A may use to provide client device 100 with access to the network service via service instance 104.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A first router configured to:

forward, along a first path within a network, network traffic for a session between a client device and a network service instance hosted by a server, wherein a plurality of routers of the network connect the client device to the network service instance hosted by the server, the plurality of routers including the first router, and wherein the first router is connected to the network service instance via the first path within the network and a second path within the network, the second path being different from the first path;

determine one or more metrics related to establishment of the session using the first path, the one or more metrics derived by monitoring a state of the session prior to, during, or after the establishment of the session using the first path; and based at least in part on determining that establishment of the session using the first path is successful but the one or more metrics related to establishment of the session using the first path do not satisfy one or more session performance requirements for establishment of the session, forward, along the second path, the network traffic for the session between the client device and the network service instance.

2. The first router of claim 1, further configured to monitor one or more session establishment messages carried by packets of the session for establishment of the session to derive the one or more metrics related to the establishment of the session.

3. The first router of claim 2, wherein to monitor the one or more session establishment messages carried by the packets of the session for establishment of the session to derive the one or more metrics related to the establishment of the session, the first router is configured to:

determine, based on the one or more session establishment messages, the state of the session;

determine, based on the state of the session, whether the session has established; and generate, based on the determination of whether the session has established, the one or more metrics related to the establishment of the session.

4. The first router of claim 1, wherein the first router is further configured to:
receive the one or more session performance requirements for establishment of the session.

5. The first router of claim 1, wherein the one or more metrics related to establishment of the session comprise one or more of:
a time to establish the session;
a number of session time-outs prior to establishment of the session;
a number of failures to establish the session due to an unreachable destination error;
a number of sessions closed before establishment of a Transmission Control Protocol (TCP) session; or
a number of sessions closed before establishment of a Transport Layer Security (TLS) session.

6. The first router of claim 1, wherein, to forward, along the second path, the network traffic for the session based at least in part on determining that the one or more metrics related to establishment of the session using the first path do not satisfy the one or more session performance requirements for establishment of the session, the first router is configured to:
forward, along the second path, the network traffic for the session based at least in part on determining that a measured time to establish the session exceeds a requirement for a time to establish the session.

7. The first router of claim 1, wherein, to forward, along the second path, the network traffic for the session based at least in part on determining that the one or more metrics related to establishment of the session using the first path do not satisfy the one or more session performance requirements for establishment of the session, the first router is configured to:
forward, along the second path, the network traffic for the session based at least in part on determining that a measured number of session time-outs prior to establishment of the session exceeds a requirement for a number of session time-outs prior to establishment of the session.

8. The first router of claim 1, wherein the session comprises one of:
a Transmission Control Protocol (TCP) session;
a Transport Layer Security (TLS) session;
a User Datagram Protocol (UDP) session; or
an Internet Control Message Protocol (ICMP) session.

9. The first router of claim 1,
wherein to forward, along the first path, the network traffic for the session, the first router is configured to forward, via a first interface of the first router and along the first path, the network traffic for the session, and
wherein to forward, along the second path, the network traffic for the session, the first router is configured to forward, via a second interface of the first router and along the second path, the network traffic for the session.

10. A method comprising:
forwarding, by a first router of a plurality of routers of a network connecting a client device to a network service instance hosted by a server and along a first path within the network, network traffic for a session between the client device and the network service instance, wherein the first router is connected to the network service instance via the first path within the network and a second path within the network, the second path being different from the first path;
determining, by the first router, one or more metrics related to establishment of the session using the first path, the one or more metrics derived by monitoring a state of the session prior to, during, or after the establishment of the session using the first path; and
based at least in part on determining that establishment of the session using the first path is successful but the one or more metrics related to establishment of the session do not satisfy one or more session performance requirements for establishment of the session using the first path, forwarding, by the first router and along the second path, the network traffic for the session between the client device and the network service instance.

11. The method of claim 10, further comprising monitoring, by the first router, one or more session establishment messages carried by packets of the session for establishment of the session to derive the one or more metrics related to the establishment of the session.

12. The method of claim 11, wherein monitoring the one or more session establishment messages carried by the packets of the session for establishment of the session to derive the one or more metrics related to the establishment of the session comprises:
determining, based on the one or more session establishment messages, the state of the session;
determining, based on the state of the session, whether the session has established; and
generating, based on the determination of whether the session has established, the one or more metrics related to the establishment of the session.

13. The method of claim 10, further comprising:
receiving, by the first router, the one or more session performance requirements for establishment of the session.

14. The method of claim 10, wherein the one or more metrics related to establishment of the session comprise one or more of:
a time to establish the session;
a number of session time-outs prior to establishment of the session;
a number of failures to establish the session due to an unreachable destination error;
a number of sessions closed before establishment of a Transmission Control Protocol (TCP) session; or
a number of sessions closed before establishment of a Transport Layer Security (TLS) session.

15. The method of claim 10, wherein forwarding, along the second path, the network traffic for the session based at least in part on determining that the one or more metrics related to establishment of the session using the first path do not satisfy the one or more session performance requirements for establishment of the session comprises:
forwarding, by the first router and along the second path, the network traffic for the session based at least in part on determining that a measured time to establish the session exceeds a requirement for a time to establish the session.

16. The method of claim 10, wherein forwarding, along the second path, the network traffic for the session based at least in part on determining that the one or more metrics related to establishment of the session using the first path do not satisfy the one or more session performance requirements for establishment of the session comprises:
forwarding, by the first router and along the second path, the network traffic for the session based at least in part on determining that a measured number of session time-outs prior to establishment of the session exceeds a requirement for a number of session time-outs prior to establishment of the session.

17. The method of claim 10,
wherein forwarding, along the first path, the network traffic for the session comprises forwarding, via a first interface of the first router and along the first path, the network traffic for the session, and
wherein forwarding, along the second path, the network traffic for the session comprises forwarding, via a second interface of the first router and along the second path, the network traffic for the session.

18. A non-transitory, computer-readable medium comprising instructions that, when executed, are configured to cause processing circuitry of a first router to:
forward, along a first path within a network, network traffic for a session between a client device and a network service instance hosted by a server, wherein a plurality of routers of a network connect the client device to the network service instance hosted by the server, the plurality of routers including the first router, and wherein the first router is connected to the network service instance via the first path within the network and a second path within the network, the second path being different from the first path;
determine one or more metrics related to establishment of the session using the first path, the one or more metrics derived by monitoring a state of the session prior to, during, or after the establishment of the session using the first path; and
based at least in part on determining that establishment of the session using the first path is successful but the one or more metrics related to establishment of the session using the first path do not satisfy one or more session performance requirements for establishment of the session, forward, along the second path, the network traffic for the session between the client device and the network service instance.

* * * * *